(12) United States Patent
Van Den Broeck

(10) Patent No.: US 7,623,961 B2
(45) Date of Patent: Nov. 24, 2009

(54) METHOD FOR DETERMINING A TRACK OF A GEOGRAPHICAL TRAJECTORY

(75) Inventor: Wim Van Den Broeck, Kingston (JM)

(73) Assignee: Reduct, Schelle (BE)

( * ) Notice: Subject to any disclaimer, the term of this patent is extended or adjusted under 35 U.S.C. 154(b) by 0 days.

(21) Appl. No.: 10/536,006

(22) PCT Filed: Nov. 24, 2003

(86) PCT No.: PCT/BE03/00203

§ 371 (c)(1),
(2), (4) Date: Nov. 29, 2006

(87) PCT Pub. No.: WO2004/048893

PCT Pub. Date: Jun. 10, 2004

(65) Prior Publication Data

US 2007/0203639 A1     Aug. 30, 2007

Related U.S. Application Data

(60) Provisional application No. 60/428,258, filed on Nov. 22, 2002.

(30) Foreign Application Priority Data

Dec. 30, 2002     (WO) ............... PCT/BE02/00203

(51) Int. Cl.
G01C 21/00     (2006.01)
(52) U.S. Cl. ................... 701/205; 175/25; 175/26; 175/45

(58) Field of Classification Search ............ 340/995.23, 340/988, 998; 701/205, 201
See application file for complete search history.

(56) References Cited

U.S. PATENT DOCUMENTS

| 4,797,822 | A | 1/1989 | Peters |
| 5,155,916 | A | 10/1992 | Engebretson |
| 6,633,816 | B2 * | 10/2003 | Shirasaka et al. ............. 702/6 |
| 2002/0005297 | A1 | 1/2002 | Alft et al. |

FOREIGN PATENT DOCUMENTS

| AU | 200154500 | * | 7/2002 |
| EP | 0 534 338 | | 3/1993 |
| FR | 2 610 100 | | 7/1988 |
| GB | 2 331 811 | | 6/1999 |
| GB | 2 351 807 | | 1/2001 |
| GB | 2 369 685 | | 6/2002 |

* cited by examiner

*Primary Examiner*—Tuan C To
*Assistant Examiner*—Redhwan Mawari
(74) *Attorney, Agent, or Firm*—Novak Druce + Quigg; Jerold I. Schneider

(57) ABSTRACT

A method for determining a track of a geographical trajectory which has predetermined start and locations. A data collection device, which has onboard synchronized sensors, is moved between the start and end locations, and physical measurement data such as pitch, heading, roll and distance, is obtained and stored. Thereafter, the stored data is retrieved and mapped to determine error compensation. The physical measurement data, after error compensation, is used to determine the pitch profile, heading profile, distance profile and roll profile to ascertain the geographical trajectory track.

21 Claims, 19 Drawing Sheets

METHOD FOR DETERMINING A TRACK OF A GEOGRAPHICAL TRAJECTORY

CROSS-REFERENCE TO RELATED APPLICATIONS

This application is the entry into the U.S. National Stage of PCT Application No. PCT/BE2003/000203 filed Nov. 24, 2003, and claims priority from U.S. Application No. 60/428,258 filed Nov. 22, 2002, and PCT Application No. PCT/BE02/00203, filed Dec. 30, 2002, the disclosures of both of which are hereby incorporated by reference.

BACKGROUND OF THE INVENTION

The present invention relates to a method for determining a track of a geographical trajectory.

The track which is obtainable by the method of the invention can for example be used for including the location or path of a whole trajectory in a global coordinate system, for determining the length of a trajectory, for obtaining information about specified sections of a trajectory, for determining the geographical location of a specified event or other purposes.

A method for determining a track is for example known from FR-A-2610100, which relates to a method and device for determining deformations and the path of a pipe. The method known from FR-A-2610100 comprises the steps of moving a data collecting vehicle, which comprises sensors such as accelerometers and gyroscopes, through the pipe, collecting and storing samples during the movement and afterwards transferring the collected samples to a computer for determining the length and horizontal projection profile of the pipe. A known problem of sensors such as accelerometers and gyroscopes is that for measurements over a long period of time, the measurements become inaccurate due to a drift of the sensors, i.e. a build-up of errors. There is no teaching in FR-A-2610100 of how such drifts may be compensated or, in other words, how the accuracy of the collected data can be improved.

EP-A-534338 and US-A-2002/0005297 relate to methods and devices for steering or navigating a boring machine. In these methods, a sensing device comprising sensors such as accelerometers and gyroscopes is attached to the head of the boring machine, which communicates in real time with a steering unit. The steering unit sends steering signals to the head in response of signals from the sensing device. Due to the drifts of the sensors, it is necessary to reset the sensing device at given time intervals to re-establish a proper heading or orientation of the head. In US-A-2002/0005297, this resetting is performed by detecting the location of the sensing device by means of a tracker unit. In EP-A-534338, the resetting is performed by detaching the sensing device from the head and moving it to a reference location with known coordinates. There is no teaching in EP-A-534338 nor US-A-2002/0005297 of how accuracy of the sensor signals can be improved without having to reset the sensing device.

GB-A-2351807 relates to a method for well bore surveying, which makes use of a probe with an inertial measurement unit. The wellbore is surveyed by retrieving the probe from the wellbore bottom and determining the incremental positions of the probe during the retrieval using the inertial measurement unit. Some error correction is applied by referring to coordinates of a known survey endpoint and referencing to the velocity of the wireline on which the probe is suspended, but there is no teaching to apply error correction to the measurement data without the aid of this external information.

GB-A-2331811 relates to a method for well bore surveying by means of rate gyro and gravity measurements. A sonde is moved incrementally through the borehole. At each location, the rate gyro of the sonde takes two orthogonal measurements by rotating the gyro 180°, which are averaged for removing an instrument drift. This error compensation is derived from comparing two measurements of the same physical quantity and is as such limited to a single measurement instrument. Furthermore, this method requires a standstill of the sonde for rotating the gyro, which undesirably slows down the surveying method.

A method for determining geographical data of a trajectory is further known from NL-C-1017128, which describes a method for measuring a borehole. The borehole extends between a first and a second location, from which DGPS (Differential Global Positioning System) coordinates are measured. A sensing unit comprising an optical gyroscope is moved from the first to the second location for measuring the borehole. The optical gyroscope performs measurements on the first location, a plurality of intermediate locations and at the second location. A drift which occurs in the calculated track is compensated by determining the difference between the measured DGPS coordinates of the second location and gyroscope measurement of the second location and proportionally correcting each of the measurements on the intermediate locations. Such a proportional correction of measurements is however only possible without adversely affecting the accuracy of the data if the trajectory or borehole is substantially straight or has a substantially continuous bend. In case of an arbitrary trajectory, such proportional correction is insufficient for obtaining data of sufficient accuracy.

SUMMARY OF THE INVENTION

There is thus a need for a method for determining geographical data of a trajectory, by means of which the accuracy of the measurement data can be improved irrespective of the shape of the trajectory.

It is therefore an aim of the present invention to provide a method for determining geographical data of a trajectory by means of which the accuracy of data obtained from a data collecting device which is moved along the trajectory can be improved.

This aim is achieved according to a first aspect of the invention in that the method comprises the steps of the characterising part of claim 1.

This aim is also achieved according to a second aspect of the invention in that the method comprises the steps of the characterising part of claim 15.

In the following, the term "trajectory" is used to refer to the physical path which is travelled by the data collecting device during its measurement and the term "track" is used to refer to the calculated path which is obtained from the measurements of the data collecting device.

According to the first aspect of the invention, the data collecting device which is used for measuring data relating to the trajectory is provided with a set of onboard sensors, enabling the samplewise collection of physical measurement data during the movement of the device and enabling the determination of a heading profile, a pitch profile, a distance profile and a roll profile from the collected measurement data. In order to ensure that these profiles can be determined with sufficient accuracy, the onboard sensors of the device are synchronised to a common clock signal. During the movement of the device from the start location to the end location of the trajectory, the measurement data are stored, preferably in a memory of the device, for evaluation later on. Before the evaluation of the collected measurement data for determining the profiles and the track from the profiles, an error compensation is applied to measurement data of at least a first and a second sensor of the device. In other words, in the method of the invention an error compensation is already applied on the level of sensor data, before any of these data are used for calculating profiles for roll, pitch, distance or heading. As a result, the accuracy of the track which is finally obtained from the compensated measurement data can be improved.

The error compensation which is applied on the level of the measurement data according to the invention is determined by correlating the measurement data of at least the first and second sensors with each other. These sensors are different sensors in the sense that they measure different physical quantities, such as for example a speed and an acceleration or other. The correlation is performed by determining trajectory parameters by using each time the data of each sensor, i.e. by converting the measurement data to parameters relating to a common physical quantity, and mapping the trajectory parameters obtained from the data of the first sensor on the trajectory parameters obtained from the data of the second sensor. This means that measurement data of the first and second sensors are converted to trajectory parameters for enabling a comparison between the two, so that deviations in the measurement data of the first sensor can be evaluated by means of the trajectory parameters of the second sensor and vice versa.

For determining the trajectory parameters of the sensors, measurement data of previous measurements can be taken into account. These previous measurements may for example comprise previous runs of the device on the same trajectory, previous runs on a different trajectory or runs of the device on a predetermined trajectory of which the path is known. In case of first use of the data collecting device or in case no trajectory parameters are available yet, a raw track is calculated from the uncompensated measurement data and trajectory parameters are obtained by correlating the measurement data of the sensors with each other and the raw track. These trajectory parameters can then be fine-tuned by means of measurement data from subsequent runs, so that a self-learning or self-improving system can be obtained.

An example of measurement data level error compensation which can be used in the method of the invention is correlating the measurement data of a first sensor for measuring the gravitational force in a vertical plane of the device and a second sensor for measuring the angle variation around the longitudinal direction of the device. In this case, a roll position of the data collecting device is obtainable from both the first and the second sensor, more particularly by integration over the measurement data of the second sensor and directly from the measurement data of the first sensor. The integrated measurement data of the first sensor constitute first trajectory parameters for the roll position and the measurement data of the second sensor constitute second trajectory parameters for the roll position. In previous measurements, it has been determined how the first and second trajectory parameters are to be interpreted in relation to each other for detecting deviations for both sensors. These deviations in the trajectory parameters are then converted back to data deviations, which form the error compensation to be applied on the measurement data of each sensor. This error compensation is then applied to the measurement data of both sensors, before the roll profile of the data collecting device is determined on the basis of the corrected measurement data of both sensors.

Due to the error compensation on the level of measurement data, the accuracy of the pitch, heading, roll and distance profiles which are determined on the basis of the corrected measurement data can be enhanced. Consequently, by using the method of the invention for evaluating the measurement data, the data collecting device can be allowed to move independently along the trajectory, without needing additional tracking devices for pinpointing the position of the data collecting device at intermediate locations of the trajectory. Furthermore, the need for resetting the sensors at a given time during the movement of the device along the trajectory can be obviated by the method of the invention, so that control electronics for resetting sensors can be omitted in the data collecting device. Due to the possibility of moving the data collecting device independently along the trajectory, the method of the invention can be applied for obtaining geographical data of a variety of trajectories, such as for example utility ducts, onshore and offshore pipelines or the like, a track for car racing or the like, vertical or horizontal boreholes or other trajectories.

The method of the invention preferably comprises the initial step of pre-calibrating the data collecting device. This pre-calibration comprises the steps of moving the data collecting device along a predetermined trajectory in a controlled environment and mapping the measurement data collected during the movement along the predetermined trajectory on predetermined measurement data for this trajectory. From the predetermined trajectory, the track and as a result the data which should be measured by the data collecting device is known, so that by mapping the measured data and the predetermined data, an initial error compensation can be determined. This initial error compensation can comprise the above mentioned error compensation on the basis of the trajectory parameters or can form an addition to this error compensation.

Preferably, in the method of the invention at least one of the heading, pitch, roll and distance profiles is determined by fusing the measurement data of a group of sensors. This group is chosen in such a way among the set of sensors of the device that a first portion of the measurement data of said group is complementary to a second portion of the measurement data of said group. For example, a sensor group for determining the roll profile may comprise the above mentioned first sensor for measuring the gravitational force in a vertical plane of the device and a second sensor for measuring the angle variation around the longitudinal direction of the device. The measurement data of the first sensor is complementary to those of the second sensor in that the roll position is obtainable by integration over the second sensor and directly from the first sensor. This shows that, according to the invention, the measurement data of two sensors may be first correlated for error compensation and later fused for determining one of the profiles. However, the sensor groups may also comprise other sensors than those used for determining the error compensation on the level of measurement data.

The step of fusing the measurement data of the sensor group for determining one of the profiles can be performed by selecting between the complementary portions of the measurement data, for example on the basis of performance characteristics of the corresponding sensors, or by combining the complementary portions, for example by weighed average. The manner in which the measurement data is to be fused can be determined on the basis of previous measurement results, for example from the pre-calibration of the device on the predetermined trajectory. Due to the complementary portions, the profile which is obtained from the fused measurement data of the sensor group can be more accurate than a profile which would be obtained from the measurement data of a single sensor. As a result, the accuracy of the pitch, heading, roll and distance profiles may be enhanced, which may in turn lead to a higher overall accuracy of the track which is determined from these profiles.

The method of the invention preferably further comprises the step of resting the data collecting device on the start location, the end location and/or an intermediate location of the trajectory for a predetermined amount of time. This means that for example a warm-up period is applied before moving the device along the trajectory, so that the sensors are allowed to stabilise before the measurement is conducted. This may further enhance the accuracy of the measurement data and the track obtained with the method of the invention.

The method of the invention preferably further comprises the step of compensating measurement data of at least one sensor for systematic error build-up. This systematic error build-up is derived from a difference between the data measured during the resting period at the start and end locations. As the data collecting device lies still during the resting periods, the data remains substantially constant during these periods, so that a systematic error can be determined for the sensor. When this systematic error at the end location differs from that at the start location, this difference is taken into account by compensating the collected data of the sensor proportionally from start to end.

The method of the invention preferably further comprises the step of compensating the data collected by means of at least one sensor for temperature variations, which are measured during the movement by means of a temperature sensor within the data collecting device. This enables removing temperature dependent measurement errors, which may further enhance the accuracy of the measurement data and the track obtained with the method of the invention. The temperature dependency of sensors can be determined by the pre-calibration.

The method of the invention preferably further comprises the steps of determining coordinates, such as for example GPS coordinates, for at least one location of the trajectory, such as for example the start, end and/or an intermediate location, and compensating the heading, pitch and/or roll profiles for these coordinates. This may further enhance the accuracy of the profiles and the track obtained with the method of the invention.

The method of the invention preferably further comprises the steps of measuring heading, pitch and/or roll of the data collecting device at the start and end locations and compensating the calculated heading and pitch profiles for deviations from the measured heading and pitch at start and end. This may further enhance the accuracy of the profiles and the track obtained with the method of the invention.

The accuracy of the obtained data may be further enhanced according to the invention by including the steps of compensating the calculated track for trajectory constraints and/or by calculating the track twice per movement of the measurement device along the trajectory, namely forwards from start to end and backwards from end to start and then combining the two tracks into an average track.

According to the second aspect of the invention, an error compensation for the measurement data collected by means of the data collecting device is determined by relating them to geographical information and/or trajectory constraints at an early stage. To this end, trajectory heading information and/or trajectory pitch information is derived from the geographical information and/or trajectory constraints and this heading and/or pitch information is treated as measurement data of a virtual sensor, i.e. a sensor which provides data as if it were incorporated in the data collecting device but is in fact not. The virtual measurement data is organised according to a sample rate synchronous to that of the common clock signal of the data collecting device.

In the second aspect of the invention, the virtual measurement data is used for determining the error compensation for the measurement data coming from the onboard sensors, in a similar way as between the measurement data of the different sensors in the first aspect of the invention described above. More particularly, trajectory parameters are determined for both the onboard sensors and the virtual sensor, again with the constraint that the parameters of the onboard and virtual sensors relate to the same, common physical quantity. The parameters are then mapped for determining an error compensation for the measurement data of the onboard sensors.

By introducing the geographical information and/or trajectory constraints at this early stage, namely at data level, and treating this information in the same way as collected sensor information, a number of errors can be eliminated very early and the overall accuracy of the track which is calculated in the end can be enhanced. For example, this method can eliminate errors at start and end of a run of the data collecting device which are caused by high acceleration and/or deceleration and incorrect field measurements. This method is extremely suitable for use in metallic surroundings for enhancing magnetometer information, which cannot be fully trusted there.

The method of the second aspect of the invention involves substantially the same steps as that of the first aspect for evaluating the measurement data and building a track. In fact, the difference is in the input: in the first aspect the input comprises measurement data of onboard sensors of the data collecting device, whereas in the second aspect the input comprises measurement data of onboard sensors and a virtual sensor. The steps or algorithms for evaluating the data can be the same in both aspects of the invention.

Preferably, the virtual trajectory parameters are given a weight factor, which is determined on the basis of the accuracy of the heading and/or pitch information. This weight factor is then taken into account for determining the error compensation.

Preferably, the onboard and virtual trajectory parameters which are used for the correlation are XYZ coordinates. These can for example be the XYZ coordinates of a raw track determined from the measurement data of the onboard sensors and the XYZ coordinates determined from the trajectory heading and/or pitch information, which is in turn derived from the known geographical information of the trajectory and/or the trajectory constraints. In this case, the mapping comprises the calculation of the measurement sample which is nearest to each XYZ coordinate derived from the trajectory heading and/or pitch information.

The error compensation for the measurement data of the onboard sensors is preferably determined by means of intelligent averaging. This means that all the collected measurement data, including the data of the virtual sensor, is combined while using the different weights of the sensors according to their known accuracy.

The steps of determining the trajectory parameters, mapping them and determining an error compensation from them are preferably repeated one or more times, each time using the corrected measurement data as new input. In this way, the accuracy of the track which is finally calculated can be enhanced to a substantial amount and convergence with the geographical information can be obtained.

Both aspects of this invention can be combined. In other words, error compensations for the measurement data can be derived by mutually comparing measurement data of the onboard sensors as well as by comparing the measurement data of the onboard sensors with the virtual measurement data.

BRIEF DESCRIPTION OF THE DRAWINGS

In the following, the invention will be further elucidated by means of the following description and the appended figures.

DETAILED DESCRIPTION

Figure 1:
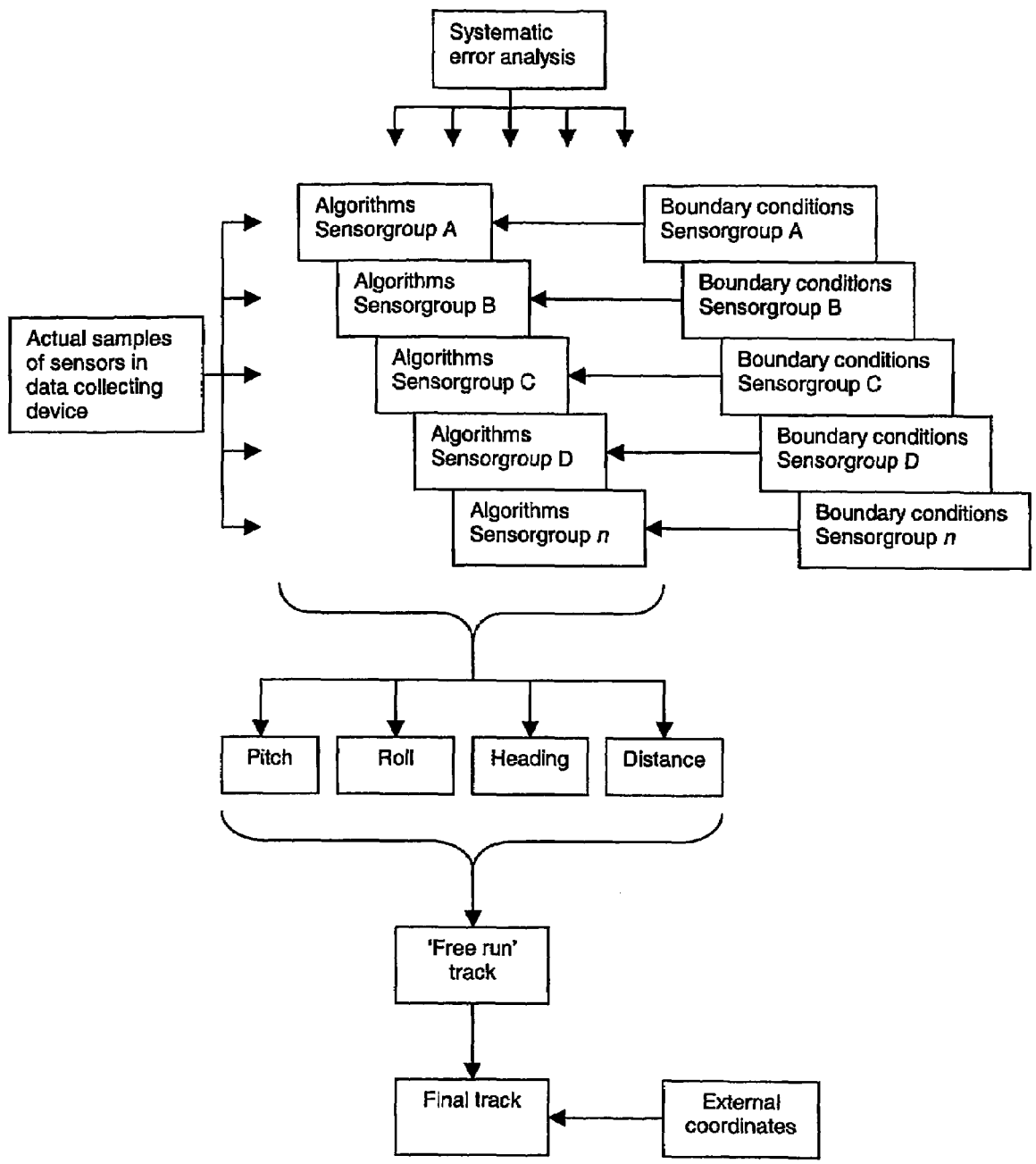
FIG. 1 shows a schematic representation of the method for obtaining geographical data of a trajectory according to the first aspect of the invention.

In the scheme shown in FIG. 1, it is shown how the measurement data, i.e. the actual samples of the sensors included in the data collecting device, are evaluated for obtaining the final track with the method of the invention. More particularly, the scheme shown in FIG. 1 shows that the method of the invention involves compensation on three levels, namely on the level of measurement data, on the level of profiles determined from the measurement data and on the level of the track determined from the profiles. Due to this compensation on three different levels, an accuracy of for example 0.05% of distance can be obtained.

The compensation on the level of measurement data comprises error compensation which is determined from a systematic error analysis. More particularly, this error compensation comprises a correction on the basis of mapping trajectory parameters, a correction for systematic error build-up and a correction for temperature variations.

The compensation on the level of pitch, heading, roll and distance profiles comprises the fusing of measurement data of selected sensor groups A, B, C, . . . n and a compensation for boundary conditions associated with each of the groups. For example, one sensor group may comprise a differentiation-based sensor and an integration-based sensor or, in other words one sensor which delivers more reliable samples in a stable portion of the trajectory (e.g. a long straight) and another sensor which delivers more reliable samples in an unstable portion (e.g. a bend). As a result, more data is obtained than strictly needed or, in other words, the measurement data of each group comprises complementary portions. This complementary data is then processed intelligently with mathematics and/or algorithms for obtaining a profile of higher accuracy.

The compensation on track level comprises a correction for determined coordinates of specified locations of the trajectory and possibly also a correction for trajectory constraints.

The data collecting device which is used for measuring the trajectory comprises a number of sensors for sample wise collecting different physical measurement values during the movement, such as for example heading, roll, acceleration, speed, temperature, gravity or other, so that data on the trajectory as well as data on the measurement conditions is obtained. Examples of sensors which are incorporated in the data collecting device are gyroscopes, accelerometers, magnetometers and a thermometer. During the movement of the device through the duct, the samples of the various sensors are accumulated in a memory of the data collecting device for evaluation later on. Alternatively, the device may also be equipped with wired or wireless means for communicating the samples to an external storage device.

In the data collecting device, the sensors are preferably associated with electronics for reducing offset errors and increasing repeatability characteristics. The latter means that it is desirable that, if a sensor shows a given offset in its samples, this offset should remain between narrow boundaries for a high number of samples. The sensors are synchronised to a common clock signal, which means that the samples of all sensors are taken substantially simultaneously with high to low and/or low to high transitions of the device clock. The sensors may have a sample rate equal to the clock rate of the clock, or a sample rate which is a multiple of the clock rate. The synchronisation of the sensors contributes to the accuracy of the track which is finally achieved.

Figure 2A:
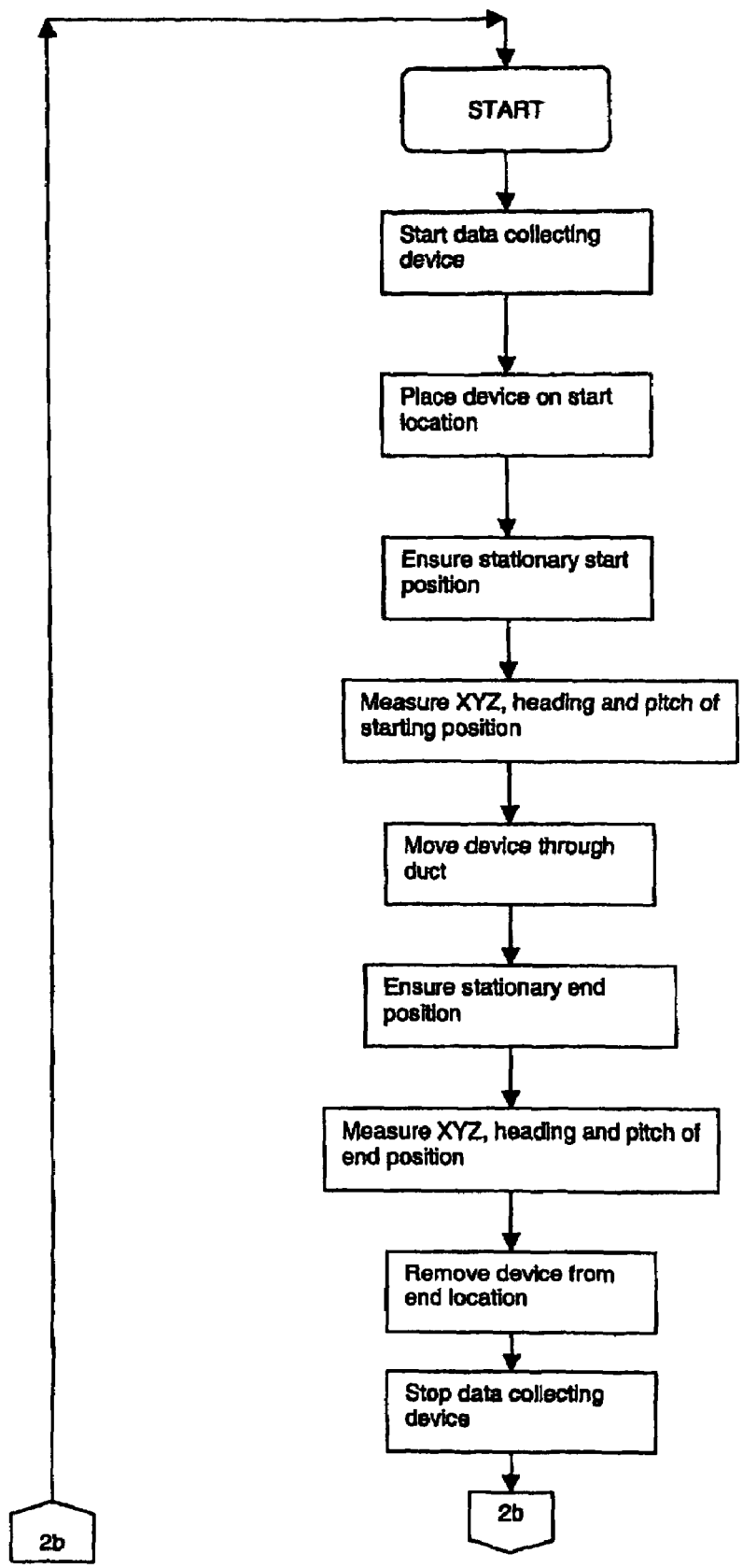
FIGS. 2a and 2b show a flow chart of a preferred method for measuring a trajectory by means of a data collecting device
Figure 2B:
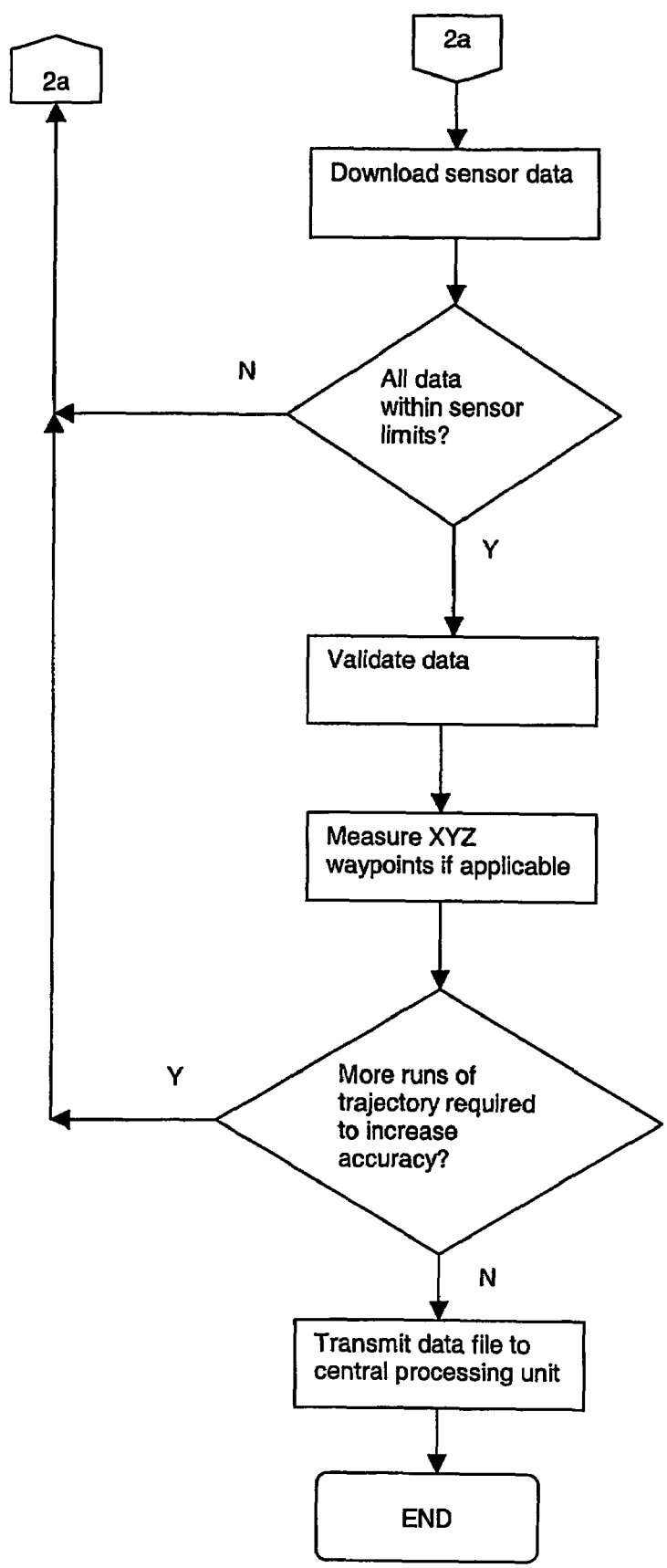
Figure 3A:
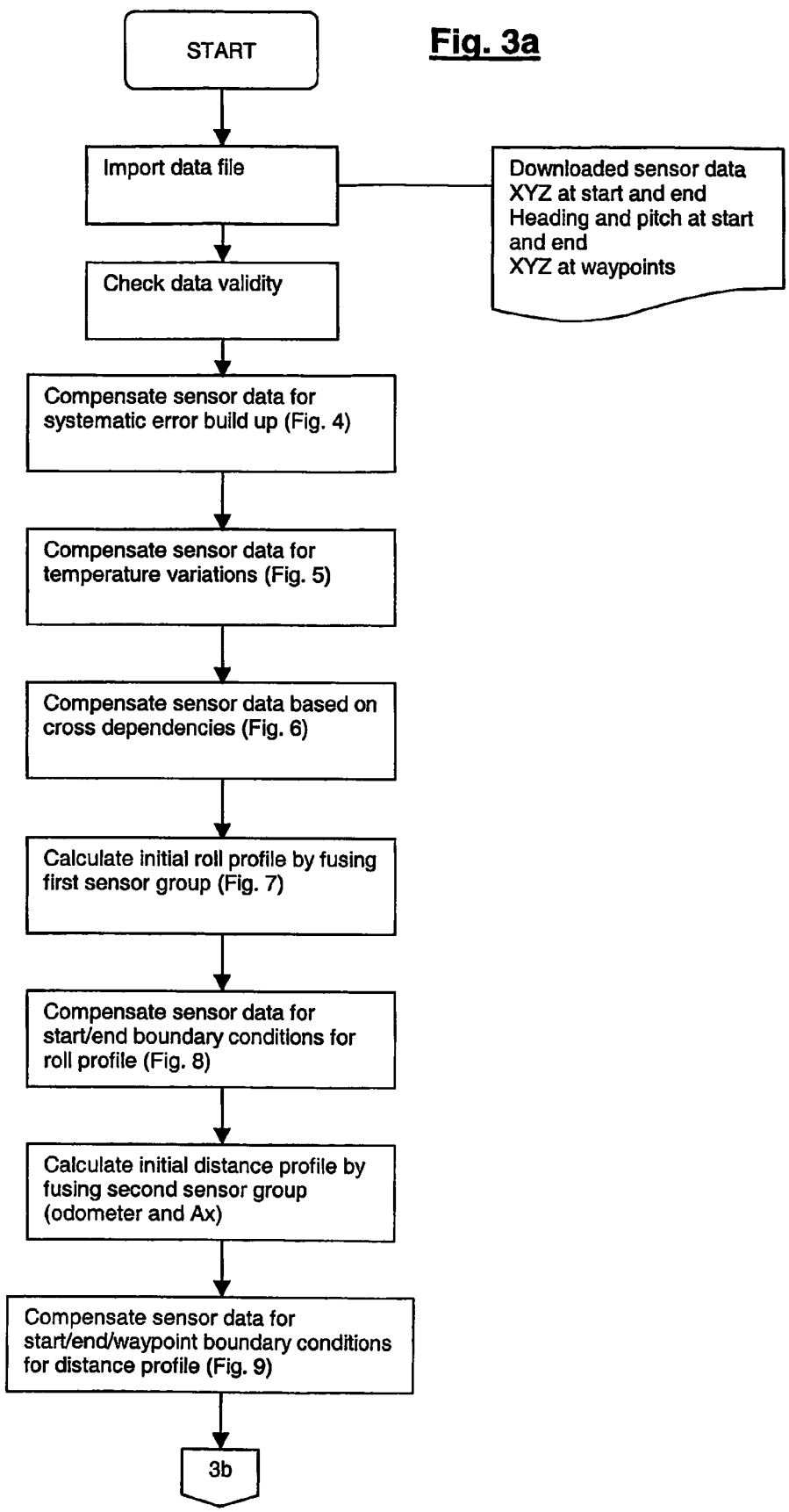
FIGS. 3a and 3b show a flow chart of a preferred algorithm for evaluating the data obtained with the method of FIGS. 2a and 2b and building a track from these data.
Figure 3B:
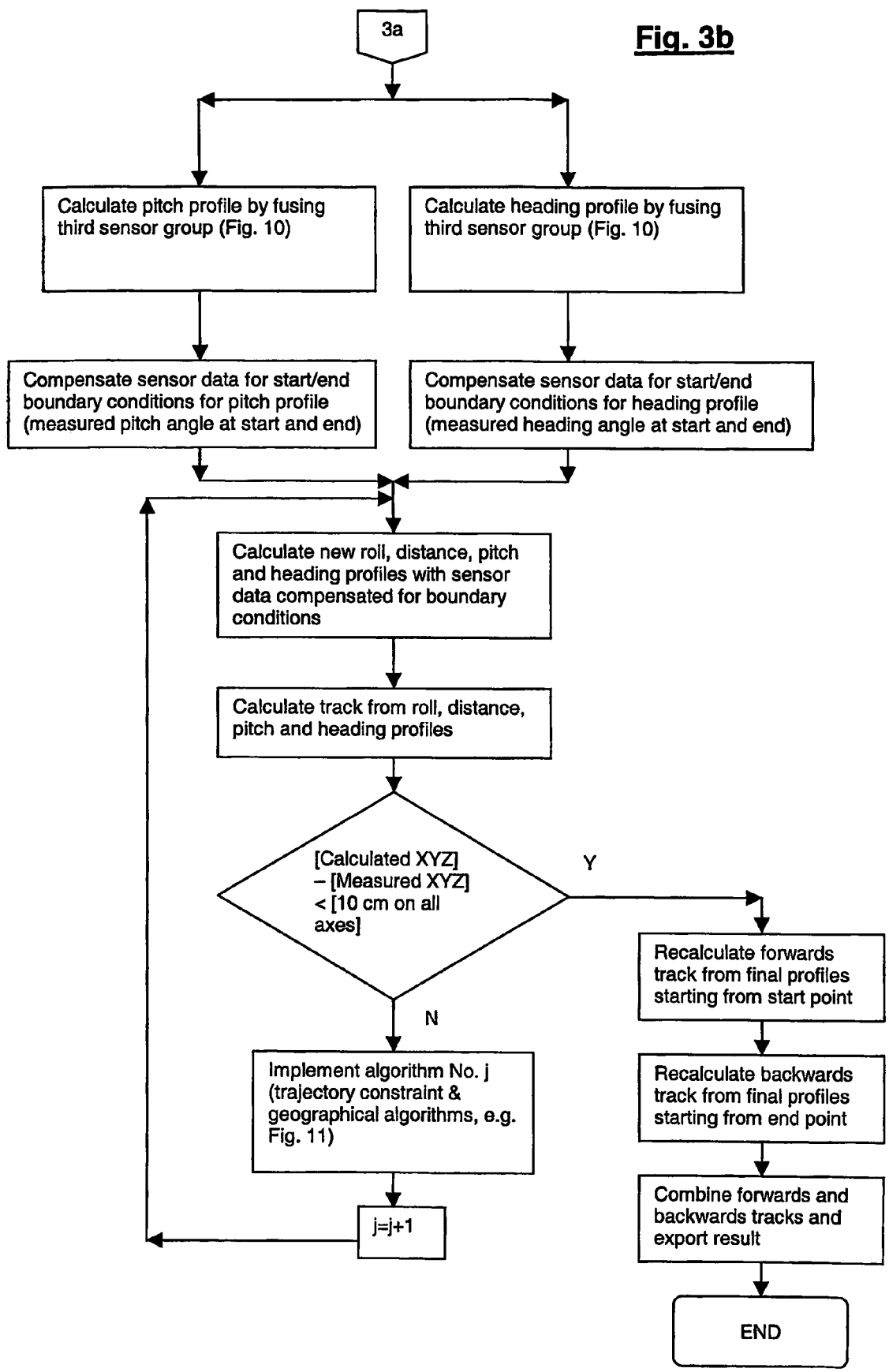

A preferred embodiment of the data collecting device, which is extremely suitable for measuring a duct, comprises the following sensors and parts:
- a 2-axis mechanical rotating gyro for the measurement of the heading and pitch angles (Wy, Wz), with built-in-thermometer
- a vibrating structure gyro for the dynamic measurement of the roll angle (Wx),
- at least four accelerometers for the measurement of xyz-displacements of the device, one (Ax) directed along the longitudinal or x-axis of the device and the three others (Ayz000, Ayz120 and Ayz240) mounted in star configuration in the yz-plane, substantially perpendicular to the x-axis, a sensor for the measurement of high frequency beacons (high frequency coils), for example placed at the entry, exit and optionally at intermediate locations of the duct, magnetometers for measuring the earth magnetism along the axes of the device (Mx, My and Mz), two thermometers for temperature measurement (T), one (T1) attached to the mechanical rotating gyro and one (T2) attached to the displacement accelerometers, an odometer or other device for measuring the distance travelled with respect to the starting point, a memory for storing the measured samples, a rechargeable battery for powering the device, the device is preferably able to operate independently in ducts of DN40 (32.6 mm internal), or narrower or wider, The preferred embodiment of the method of the invention described here, of which the trajectory measurement steps are shown in FIGS. 2a and 2b and the data evaluation steps are shown in FIGS. 3a and 3b, further comprises the initial step of pre-calibrating the data collecting device for obtaining information on how the sensors of the device react to different circumstances and different movements. This pre-calibration may for example comprise a series of laboratory tests such as for example moving the device along a known trajectory, subjecting the device to given accelerations, testing reactions of the device to temperature or changes in temperature, or other tests. From the pre-calibration results, it can be determined how the dependency of sensor data of a given sensor on different circumstances/movements shows up in the sensor data of another sensor. An overview of dependencies of sensor data on various circumstances/movements and the activators of the circumstances/movements are given in table 1. From this pre-calibration, an error compensation can be determined for at least some of the sensors. This error compensation comprises a correction for a cross dependency between sensors and a correction for temperature variations and possibly other corrections. The information which is obtained from the pre-calibration, i.e. the performance characteristics of sensors under different circumstances and in relation to the movements of the data collecting device during the measurement of a trajectory, is used for implementing compensation algorithms in the evaluation method of FIGS. 3a and 3b.

The cross dependency of two sensors is determined by converting the measurement data of the one and the other sensor, collected during the pre-calibration tests, into a comparable format, which is herein referred to as trajectory parameters. The error compensation for cross dependency of the sensors is determined by mapping the trajectory parameters of the sensors on each other, so that deviations in the measurement data of the one sensor can be shown by means of the other sensor and vice versa. From this mapping, an error compensation is determined for both sensors, which is later on applied in the evaluation of measurement data for building the track of an unknown trajectory (see FIG. 6).

In the following, the different steps of the preferred method of FIGS. 2a and 2b for measuring a trajectory by means of the data collecting device are described in detail.

First, the data collecting device is switched on and placed on the start location of the trajectory to be measured. The device is allowed to rest for a warming up period of for example 30 seconds at the starting point, so that the sensors of the device are allowed to stabilise before measurement of the trajectory is started with. The samples measured during this warming up period are used for systematic error build-up compensation (see FIG. 4).

Next, the coordinates, heading and pitch of the start location of the trajectory are measured. This can either be performed by means of the data collecting device, if the appropriate sensors are provided in the device, or by means of external measurement devices. The accuracy of these measurements will correspondingly impact the accuracy of the calculated track.

The data collecting device is then moved along the trajectory, i.e. through the duct to be measured in this example. The data collecting device is preferably moved through the duct by air propulsion, driven by a compressor, at a speed which is held as stable as possible. The movement of the device can be achieved by means which are part of the device, such as for example a battery operated electric motor or other. The movement can also be achieved by external means, such as for example gas propulsion, liquid floating, cable pulling or other. The external moving means are preferred for mapping longer ducts.

Figure 4:
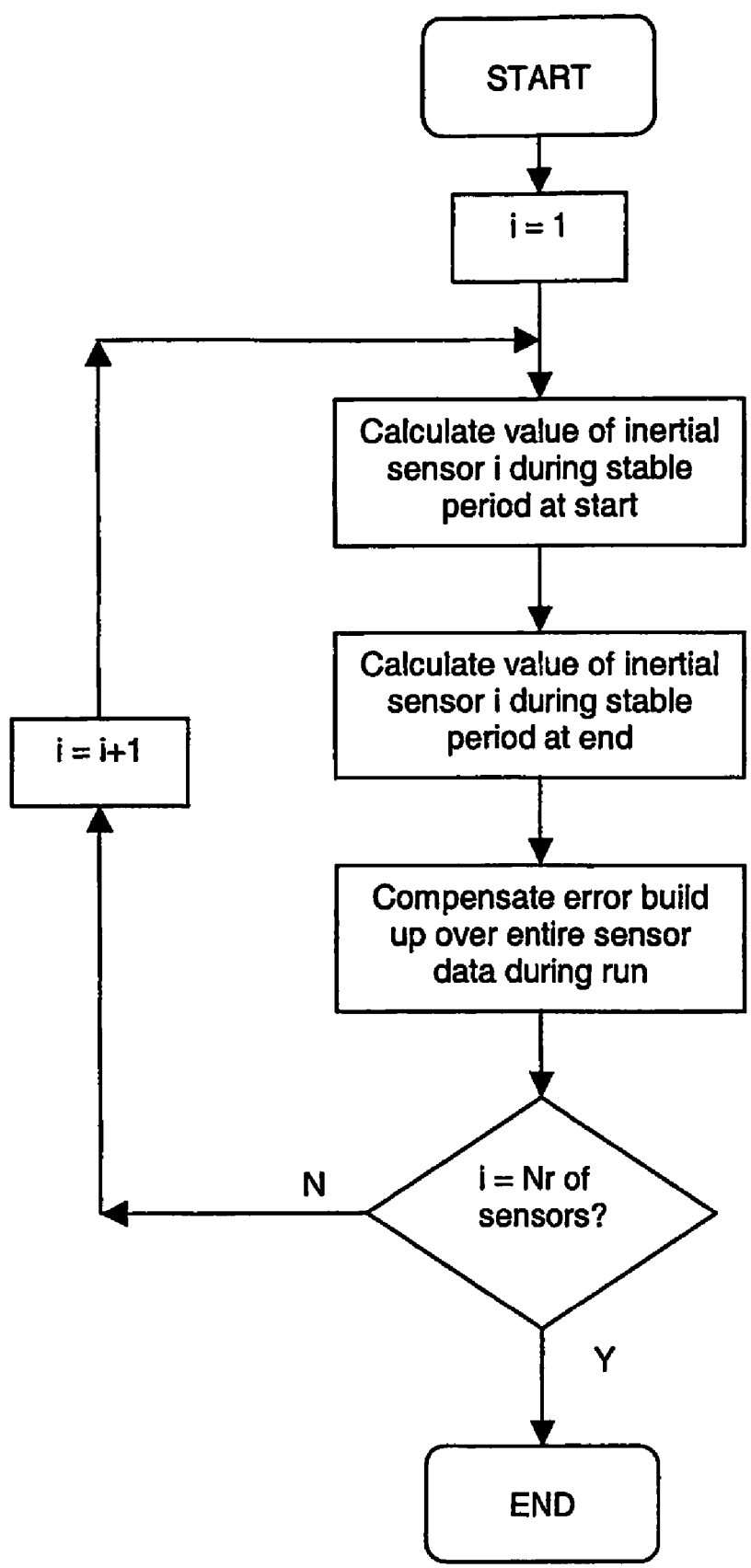
FIG. 4 shows a flow chart of a sub-algorithm of the algorithm of FIGS. 3a and 3b for compensating systematic build-up.

At the end location of the trajectory, the data collecting device is again allowed to rest for a period of for example 30 seconds, so that further samples are obtained by means of which compensation for systematic error build-up can be performed (see FIG. 4). The coordinates, heading and pitch of the end location are measured as well. Then, measurement of the data collecting device is stopped.

If applicable, coordinates may also be measured at waypoints or intermediate locations of the trajectory. At these waypoints, high frequency coils or other position markers may be placed so that passage of the device can be detected by means of a sensor.

Next, the accumulated samples are downloaded from the memory of the device to an on-site evaluation system, which may for example be formed by a computer with appropriate software. The sensor data, i.e. the accumulated samples, is validated for consistency, temperature range, measurement range and saturation, and it is established whether an additional run of the data collecting device along the trajectory is needed for enhancing the accuracy. Finally, the data file comprising the sensor data and the data from heading, pitch and coordinate measurements at start, end and intermediate points is transmitted to a central processing unit.

For improving the accuracy of the measurement by means of the method shown in FIGS. 2a and 2b, it is preferred that the following measures are taken:

the data collecting device is allowed to stabilise its temperature, which is verified by means of uploading 5 minutes of data;

some daily calibration tests are performed at the starting location.

In the following, the different steps of the preferred method of FIGS. 3a and 3b for evaluating the data file in the central processing unit are described in detail.

First the data file, which comprises the sensor data or samples and the data from heading, pitch and coordinate measurements, is imported and checked a second time for validity. Before any of the sensor data is combined or fused for obtaining a profile for heading, pitch, roll and/or distance, a number of compensation steps are applied to the sensor data. More particularly, the sensor data is compensated for systematic error build-up (as shown in FIG. 4), for temperature variations (as shown in FIG. 5) and for cross dependencies (as shown in FIG. 6).

The compensation on the level of sensor data for systematic error build-up is shown in the sub-algorithm of FIG. 4.

This compensation is based on a difference between the value of the sensor in consideration during the stable period at the start location with respect to its value at the end location. This difference or built-up systematic error is compensated by spreading it out proportionally over the entire sensor data during the run along the trajectory.

Figure 5:
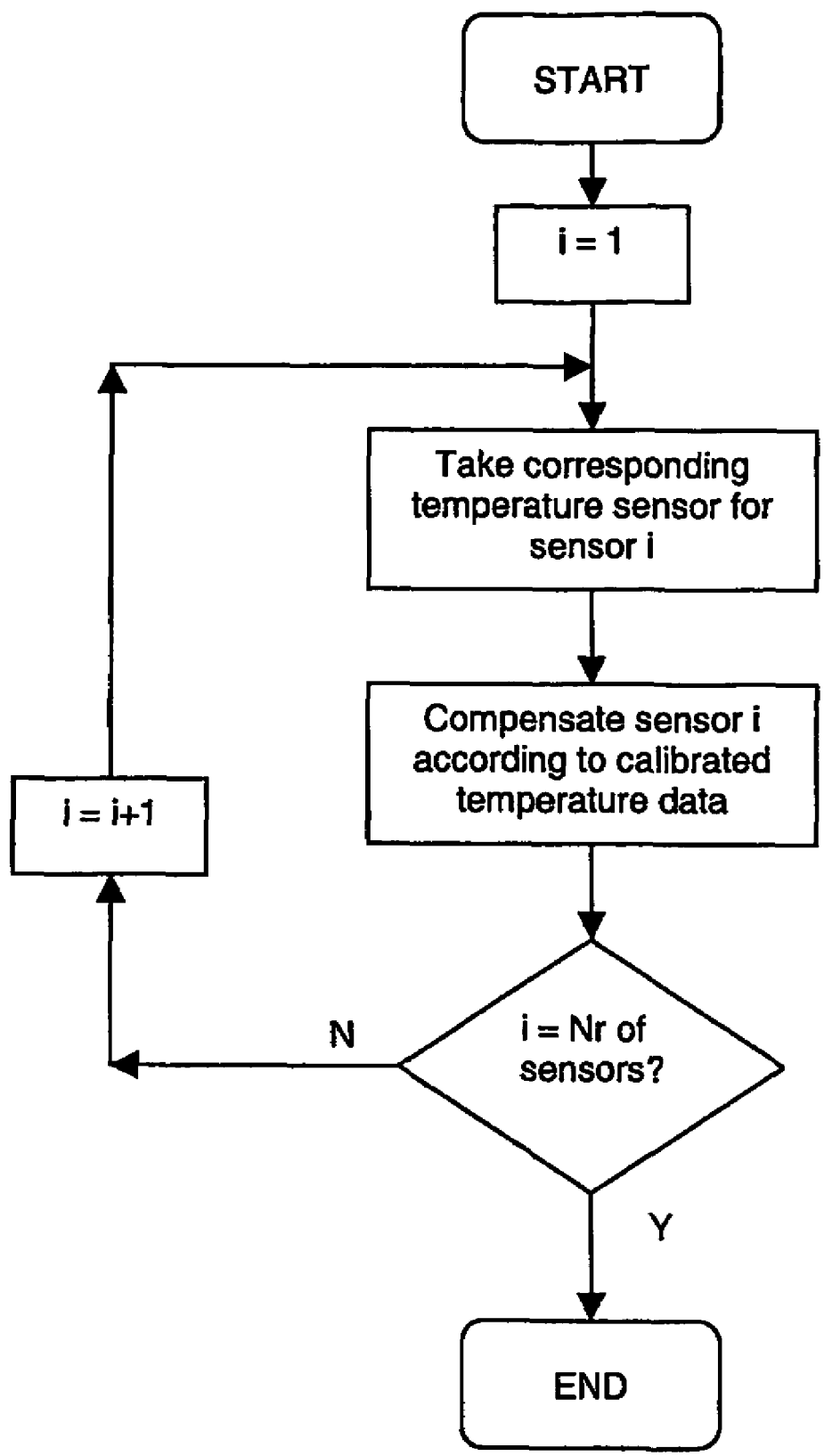
FIG. 5 shows a flow chart of a sub-algorithm of the algorithm of FIGS. 3a and 3b for compensating sensor data for temperature variations.
Figure 6:
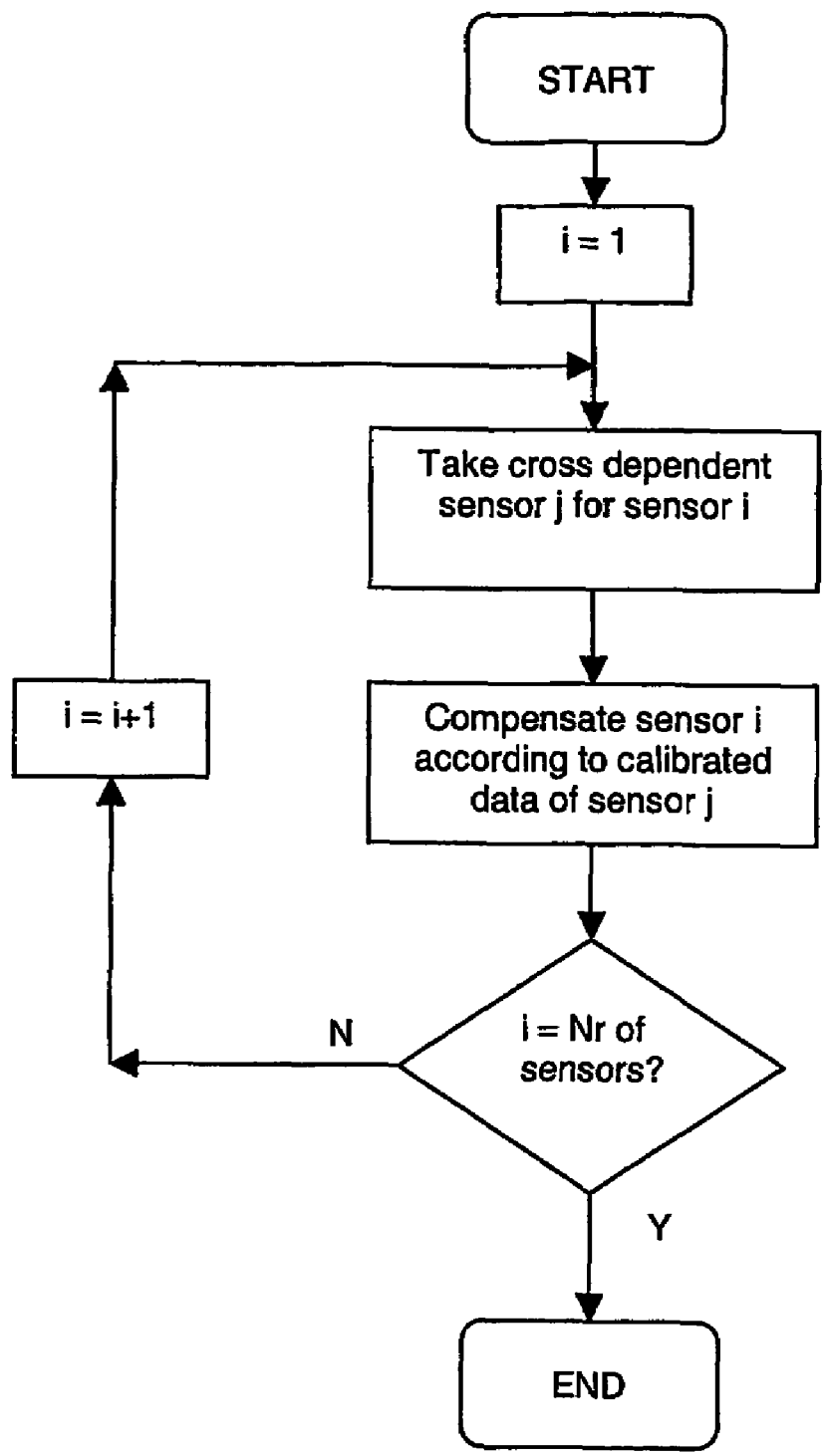
FIG. 6 shows a flow chart of a sub-algorithm of the algorithm of FIGS. 3a and 3b for compensating sensor data based on cross dependencies.

The compensation on the level of sensor data for temperature variations is shown in the sub-algorithm of FIG. 5. The samples of the sensor in consideration are compensated by correlating them with the data of the corresponding temperature sensor and with the pre-calibration results.

The compensation on the level of sensor data for cross dependencies is shown in the sub-algorithm of FIG. 6. The samples of the sensor in consideration are compensated by correlating them with the samples of sensors which are cross dependent with this sensor and with the pre-calibration results.

Figure 7:
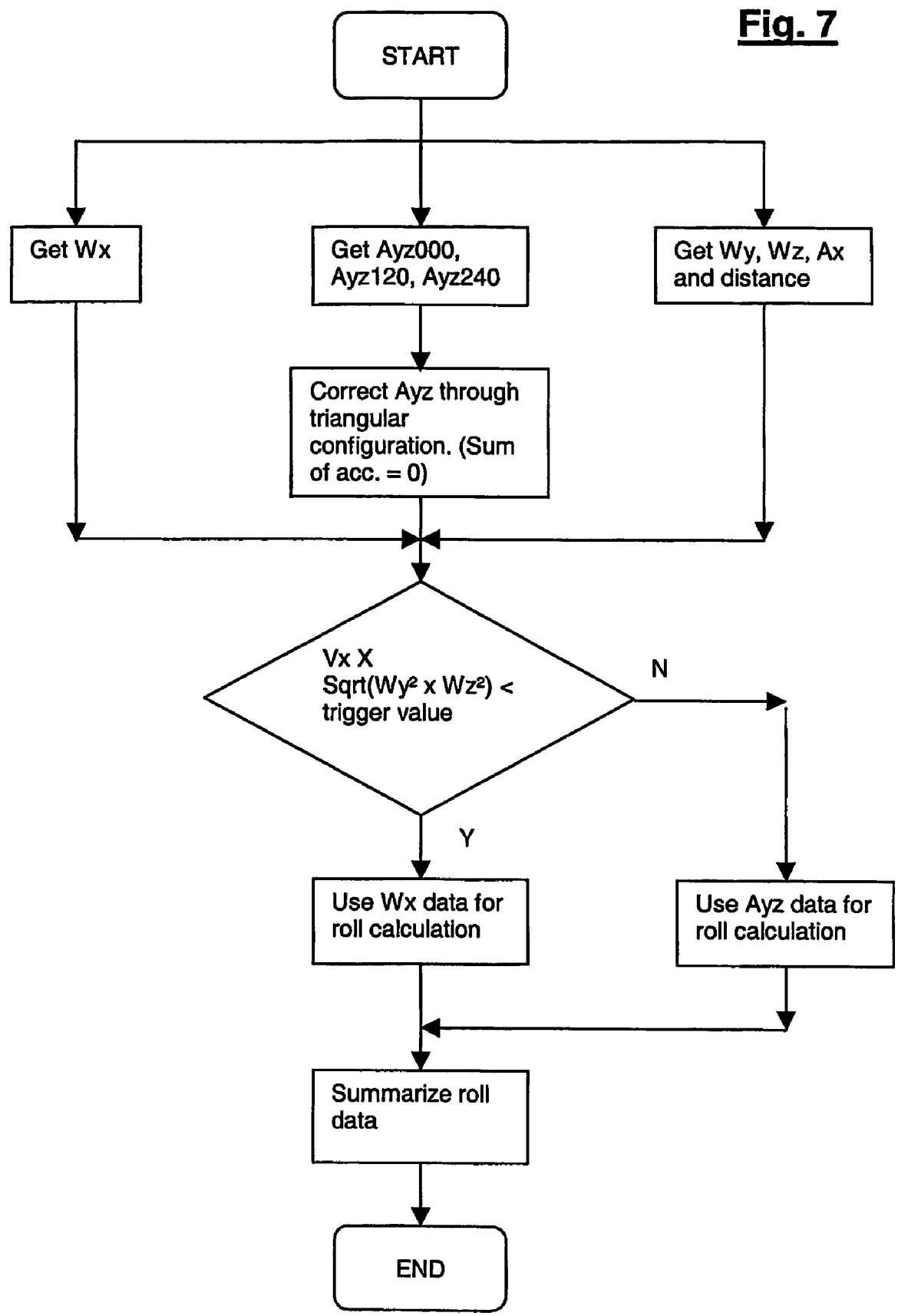
FIG. 7 shows a flow chart of a sub-algorithm of the algorithm of FIGS. 3a and 3b for calculating an initial roll profile.

Next, an initial roll profile is calculated by fusing the sensor data of a first sensor group in the sub-algorithm of FIG. 7. The first sensor group comprises the Wx and Ayz sensors as basis for calculating the roll profile and the Wy, Wz, Ax and distance sensors for making a selection between the Wx and Ayz sensors. The Ayz sensor data is first corrected on the basis of its triangular configuration, which implies that the sum of the three accelerometers is necessarily 0. The decision of whether to use the Wx or the Ayz sensor for the respective location of the trajectory is made using the equation:

$$Vx \; Sqrt(Wy^2 \times Wz^2) < \text{trigger value}$$

wherein Vx (speed) is obtained from the odometer or other speed measuring device. The trigger value is obtained from pre-calibration results.

Figure 8:
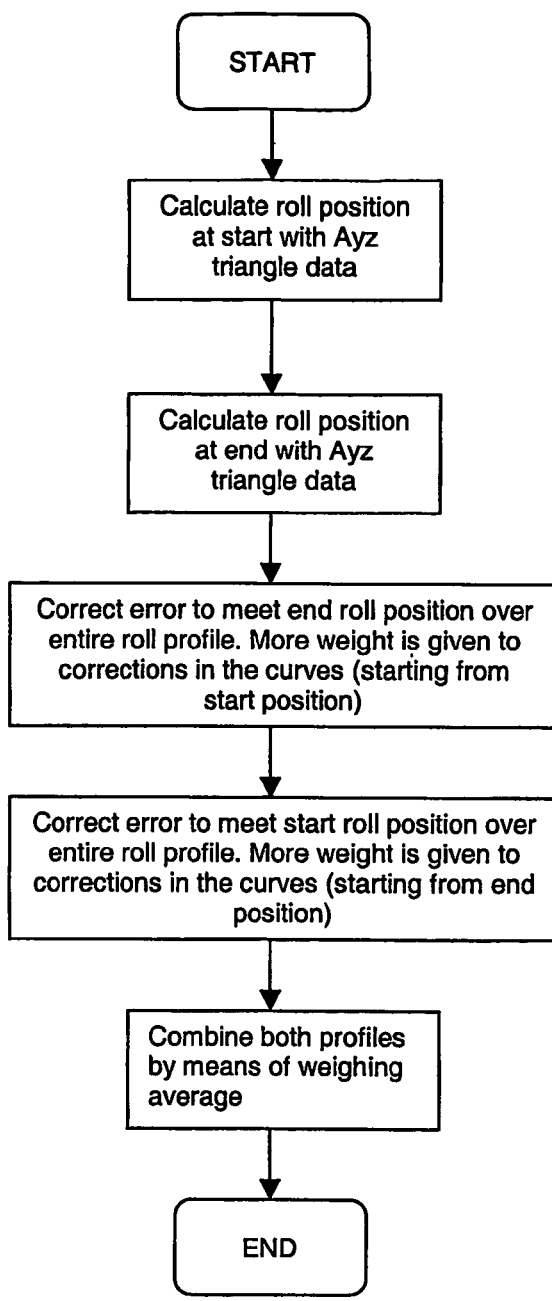
FIG. 8 shows a flow chart of a sub-algorithm of the algorithm of FIGS. 3a and 3b for compensating the roll profile for start and end boundary conditions.

Next, the sensor data of the first sensor group is compensated by comparing the initial roll profile with start and end boundary conditions for the roll profile, by means of the sub-algorithm of FIG. 8. The start and end roll positions are calculated with the Ayz triangle sensor data. A first correction is applied forwards over the entire roll profile, i.e. from start to end, in such a way that a first roll profile is obtained which meets the end roll position of the Ayz sensor. A second correction is applied backwards over the entire roll profile, i.e. from start to end, in such a way that a second roll profile is obtained which meets the start roll position of the Ayz sensor. For both corrections, more weight is given to corrections on measurements in the curves of the trajectory, since the roll position accuracy is more affected in curves than in straights. Preferably, the correction factor curves/straights equals 6/1. Finally, the first and second roll profiles are combined by means of weighed average.

Next, an initial distance profile is calculated by fusing the sensor data of a second sensor group, which is formed by the Ax sensor and the distance sensor. The initial distance profile is preferably calculated by double integration of the Ax samples and subsequently combining the twice integrated Ax with the distance samples by means of weighed average.

Figure 9:
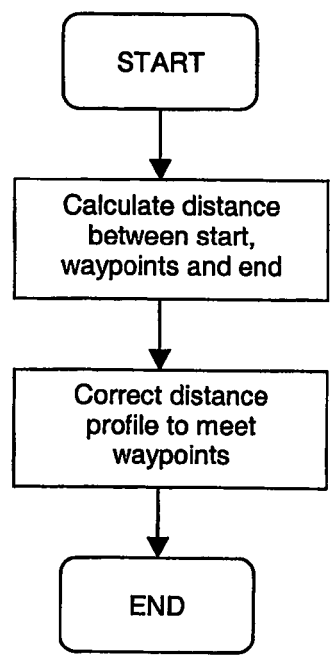
FIG. 9 shows a flow chart of a sub-algorithm of the algorithm of FIGS. 3a and 3b for compensating an initial distance profile for waypoint boundary conditions.

The sensor data of the second sensor group is then compensated by comparing the initial distance profile with start, end and waypoint boundary conditions for the distance profile, by means of the sub-algorithm of FIG. 9. This compensation is performed by calculating the distance between the start, waypoints and end and correcting the sensor data in such a way that the distance profile meets the waypoints.

Figure 10:
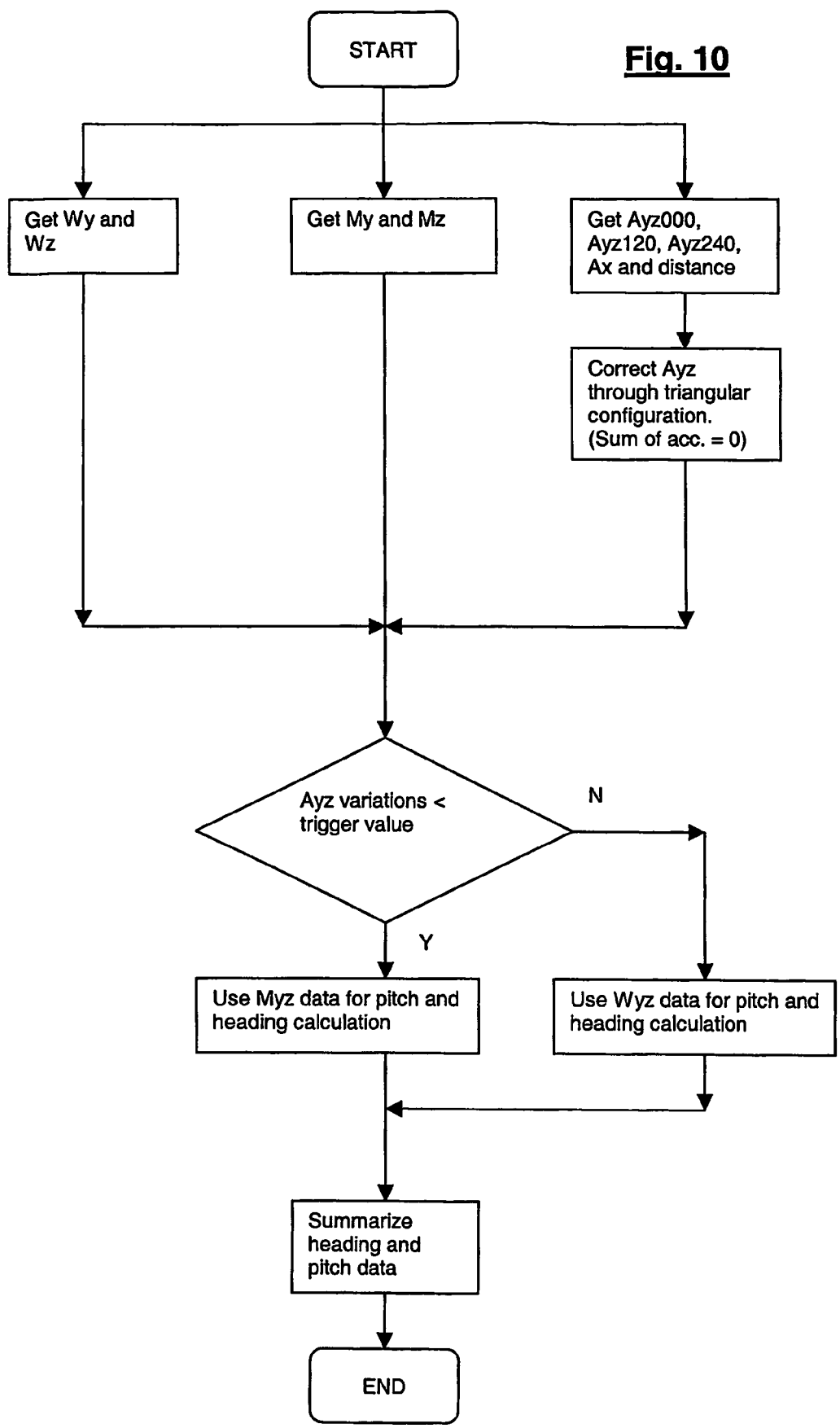
FIG. 10 shows a flow chart of a sub-algorithm of the algorithm of FIGS. 3a and 3b for calculating initial heading and pitch profiles.

Next, initial pitch and heading profiles are calculated by fusing the sensor data of a third sensor group in the sub-algorithm of FIG. 10. The third sensor group comprises the Wy and Wz sensor (2-axis mechanical rotating gyro) and the My and Mz sensors (magnetometers) as basis for calculating the pitch and heading profiles and the Ayz (triangle accelerometer), Ax (x-axis accelerometer) and distance sensors for making a selection between the WyWz and MyMz sensor data for calculating the pitch and heading profiles. The Ayz samples are first corrected through triangular configuration, as mentioned above with respect to the sub-algorithm of FIG. 7. The selection is based on the equation:

$$\text{Ayz variations} < \text{trigger value,}$$

with the trigger value being derived from pre-calibration results.

Next, the sensor data of the third sensor group is compensated by comparing the initial pitch and heading profiles with start and end boundary conditions, namely the measured pitch and heading at the start and end locations of the trajectory.

After these steps of calculating initial profiles and compensating sensor data by comparison of the initial profiles with boundary conditions, the roll, distance, pitch and heading profiles are recalculated with the compensated sensor data. These new profiles are then used for calculating a first track. This first track is then tested for compliance with the desired accuracy by comparing the calculated coordinates of the end of the calculated track with the measured coordinates of the end location of the trajectory, which can be summarised in the condition:

$$\text{Calculated } XYZ - \text{Measured } XYZ < \text{limit}$$

A suitable limit is for example 10 cm on all axes, but this limit may also be chosen wider or narrower.

If the first track is within the limit, the track is recalculated by fusing the final roll, distance, pitch and heading profiles from start to end into a forwards track, fusing the final profiles from end to start into a backwards track and combining the forwards and backwards tracks into by weighed average into a final track. The backwards calculated track may lead to a different result since the measurements of the sensors have a two-way influence on each other. This forwards and backwards recalculation leads to a further improvement in the accuracy of the resulting final track, so that the final track is well within the desired accuracy limits.

On the other hand, if the first track is outside the limit, some further compensation algorithms are applied for compensating the roll, distance, pitch and heading profiles for trajectory constraints and/or geographical information. These further compensation algorithms may comprise one or more of the following:

- an algorithm for correcting the track for deviations of the calculated start, end and/or waypoint coordinates to the measured coordinates of the start location, the end location and/or intermediate locations of the trajectory and applying a proportional correction to track points in between the measured coordinates;
- an algorithm for correcting the track to align with measured coordinates of objects outside the trajectory, such as for example a river or other objects;
- one or more algorithms for correcting the track to physical constraints of the trajectory, such as for example a maximum or standard curvature (e.g. 30°, 45°, . . . ) of bent portions of the trajectory, a minimum length of straight portions of the trajectory, or in the case of a drilling pipe, the distance between welds of pipe portions having a standard length, or other physical constraints.

Figure 11:
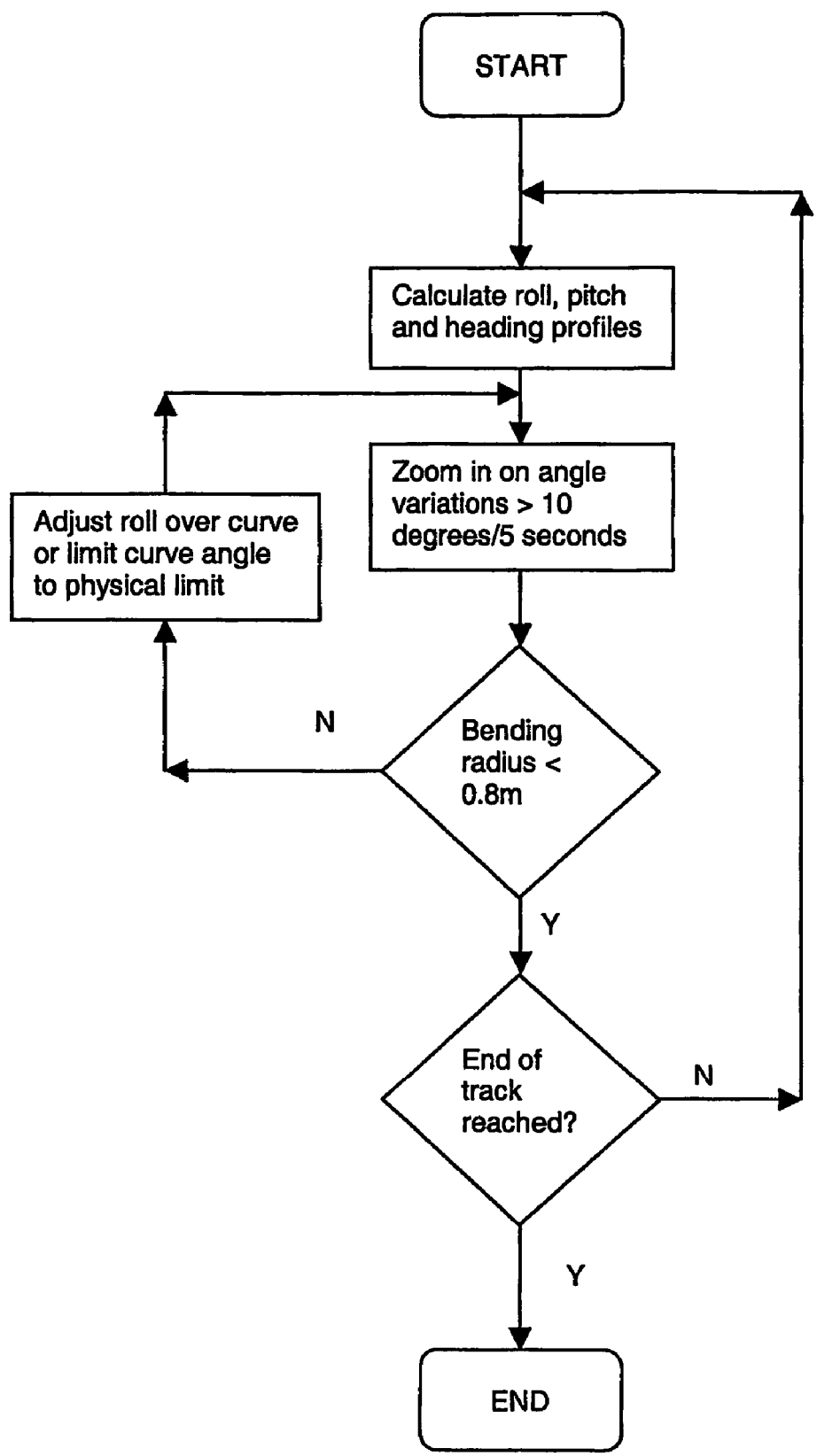
FIG. 11 shows a flow chart of a sub-algorithm of the algorithm of FIGS. 3a and 3b for implementing trajectory constraints.

An example of an algorithm for correcting the track to the physical constraint of a maximum curvature of a bent portion of the trajectory is shown in FIG. 11. After recalculation of the pitch, heading and roll profiles, bends in the track are detected by zooming in on angle variations of for example 10° in a time period of 5 seconds. For the bends, the condition is applied whether the bending radius is below or above the maximum bending radius of the physical trajectory of for example 0.8 m. If this condition is fulfilled, the bend is skipped and the next bend is considered. If this condition is not fulfilled, the bend of the track is corrected by either adjusting the roll profile over the bend or by limiting the bending radius of the bend until the physical requirement is fulfilled.

Figure 12:
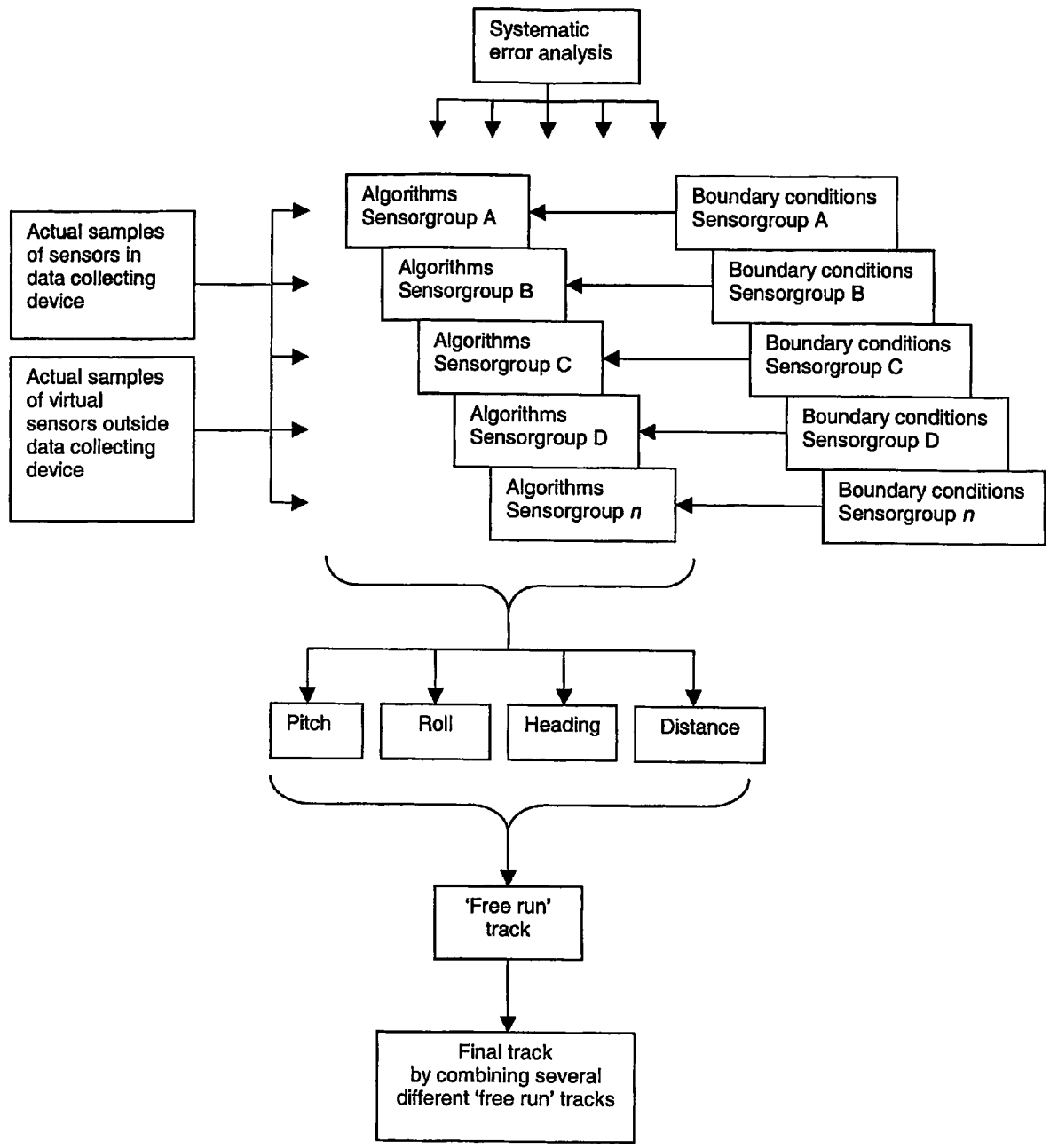
FIG. 12 shows a schematic representation of the method for obtaining geographical data of a trajectory according to the second aspect of the invention.

In the scheme shown in FIG. 12, it is shown how the measurement data, i.e. the actual samples of the sensors included in the data collecting device, are evaluated along with virtual measurement data for obtaining the final track with the method of the invention. This virtual measurement data comprises samples which are generated from external information such as geographical information or trajectory constraints, for example the accurately known heading and pitch information of above ground parts of the trajectory, the generally known heading information when the trajectory runs alongside a road, the general pitch information at the start and end of a drilling, or other external information derived without the use of the data collecting device. In the scheme of FIG. 1, this information was used to apply a correction on track level. In the scheme of FIG. 12, this information is presented as measurement data so that it can be introduced on the much lower data level, which can highly improve the final accuracy of the calculated track.

The scheme shown in FIG. 12 can again involve compensation on three levels, namely on the level of measurement data, on the level of profiles determined from the measurement data and on the level of the track determined from the profiles. The compensation on the three levels can comprise that which has already been described with respect to the scheme of FIG. 1 and will therefore not be repeated in detail here.

The method for collecting measurement data remains substantially the same as that described with reference to FIGS. 2a and 2b. The method for evaluating the collected measurement data with the immediate introduction of the geographical information and/or trajectory constraints at sensor data level is generally shown by the algorithm of FIGS. 13a and 13b.

Figure 13A:
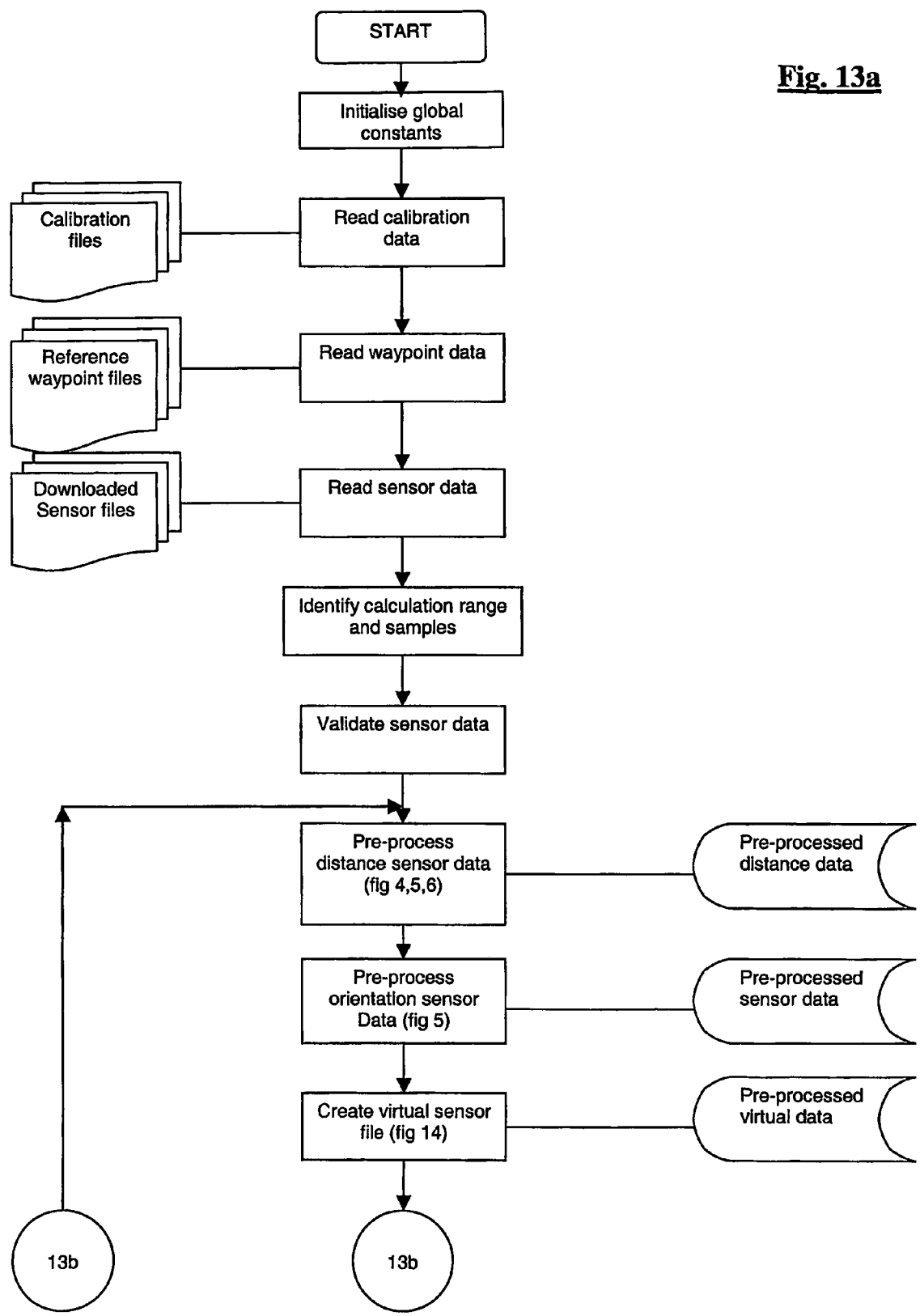
FIGS. 13a and 13b show a flow chart of another preferred algorithm for evaluating the data obtained with the method of FIGS. 2a and 2b and building a track from these data.
Figure 13B:
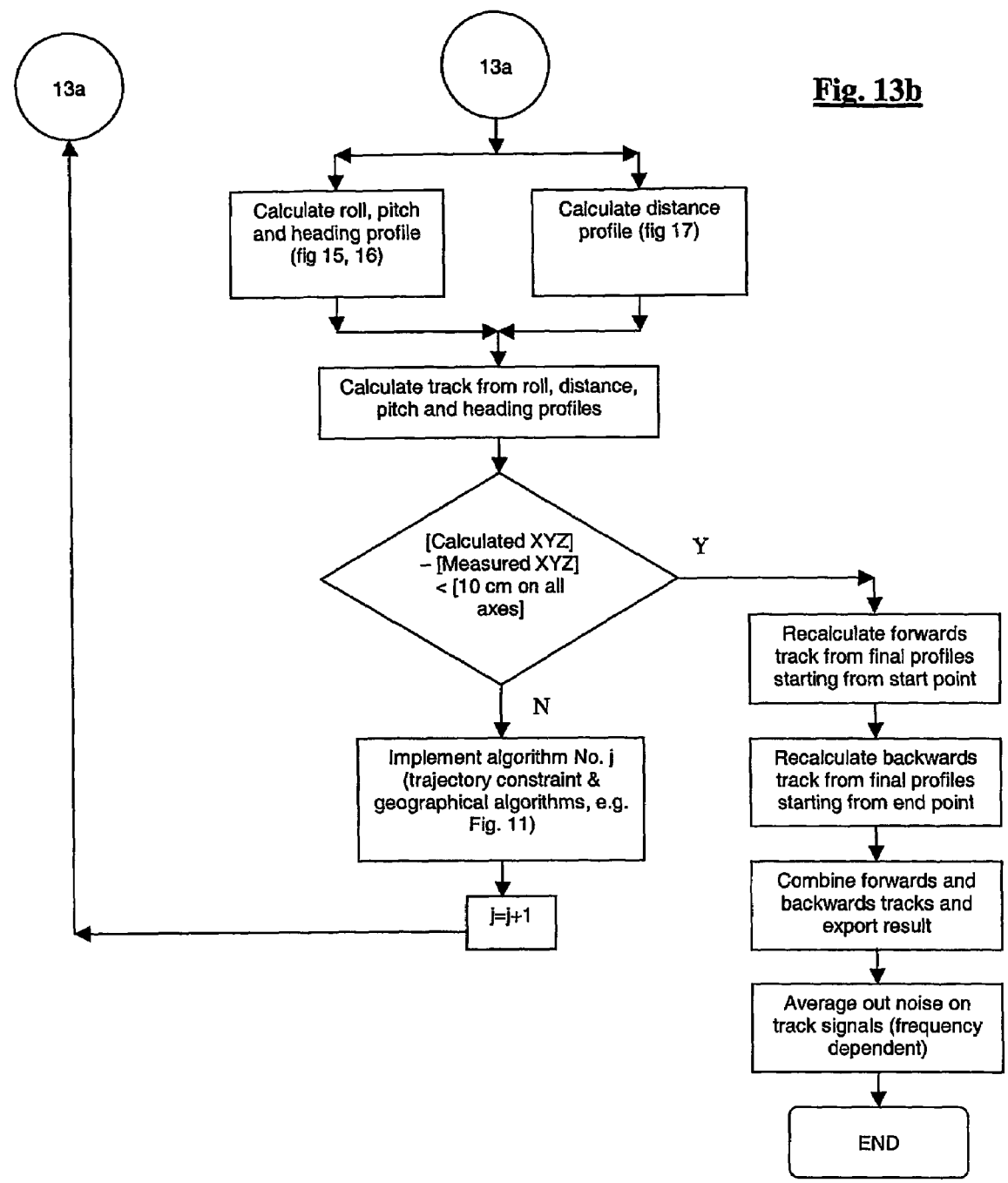

In a first step of the data evaluation method of FIGS. 13a and 13b, global constants are initialised, such as for example values relating to the earth rotation, the earth magnetic field etc. Next, a number of data files are loaded: calibration files, reference waypoint files and downloaded sensor files. The calibration files comprise data resulting from the pre-calibration of the data collecting device, which has been described with reference to FIGS. 3a and 3b and will therefore not be repeated here. The reference waypoint files comprise the known geographical information and/or trajectory constraints of the trajectory. The downloaded sensor files comprise the measurement data obtained by running the data collecting device once or more times along the trajectory. These inputted files are scanned for identifying the calculation range and samples, i.e. for identifying which series of data are relevant for the track building, and the data is validated by performing a full check for correctness of the data.

Subsequently, an iterative process begins in which the inputted data is evaluated for building a track. First, a number of pre-processing steps are performed. Here, the information which is obtained from the pre-calibration, i.e. the performance characteristics of sensors under different circumstances and in relation to the movements of the data collecting device during the measurement of a trajectory, is used for compensating the data. More particularly, the distance sensor data is pre-processed by means of the sub-algorithms shown in FIGS. 4-6 for applying compensations for systematic error build-up, for temperature variations and for cross dependencies. The orientation sensor (gyros) data is also compensated for temperature variations.

Figure 14:
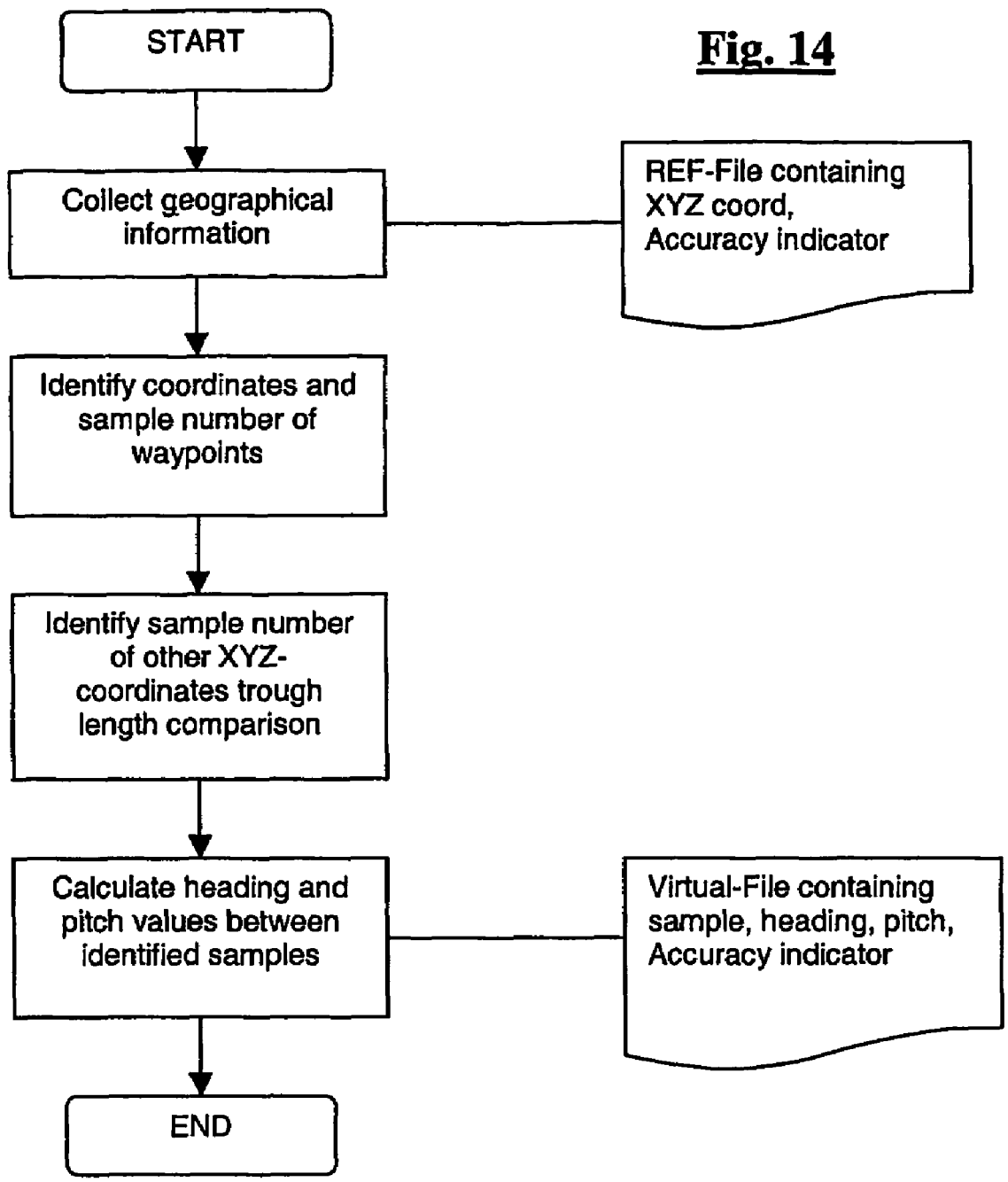
FIG. 14 shows a flow chart of a sub-algorithm of the algorithm of FIGS. 13a and 13b for organising the collected trajectory heading and pitch information as virtual sensor data.

Another pre-processing step is the creation of a virtual sensor file with the pre-processed virtual data, which comprises the reference waypoint files inputted earlier on. This step is clarified by means of the sub-algorithm of FIG. 14. The geographical information from which this virtual sensor data file is built, is inputted in the form of a reference file containing XYZ-coordinates, each accompanied by an accuracy indicator. This reference file is for example a table of XYZ-coordinates which provide the collected trajectory heading and/or pitch information. As mentioned above, some of these points are accurately known (e.g. at start or end), some are generally known (e.g. in a sidewalk or alongside a road) and other points are unknown. Each XYZ-coordinate can for example be marked for accuracy as follows:

1=accurately known for heading and pitch;
2=accurately known for heading only;
3=accurately known for pitch only;
4=general indication can be used for both pitch and heading;
5=general indication can be used for heading only;
6=general indication can be used for pitch only;
7=information unavailable after this point.

For enabling the mapping the measurement data of the onboard sensors on these XYZ-coordinates, it has to be determined which sample corresponds to which coordinate. This is done in FIG. 14 by means of length comparison (with the data of the distance sensor), leading to a first raw approximation of the track. In a final step of the sub-algorithm of FIG. 14, the virtual file is built by calculating the heading and pitch values between the identified samples, i.e. the samples which have been identified with coordinates. The achieved virtual file comprises for each identified sample a sample number, a heading, a pitch and an accuracy indicator. In this way, the virtual file is in fact synchronised to the clock rate of the clock signal of the data collecting device.

Figure 15:
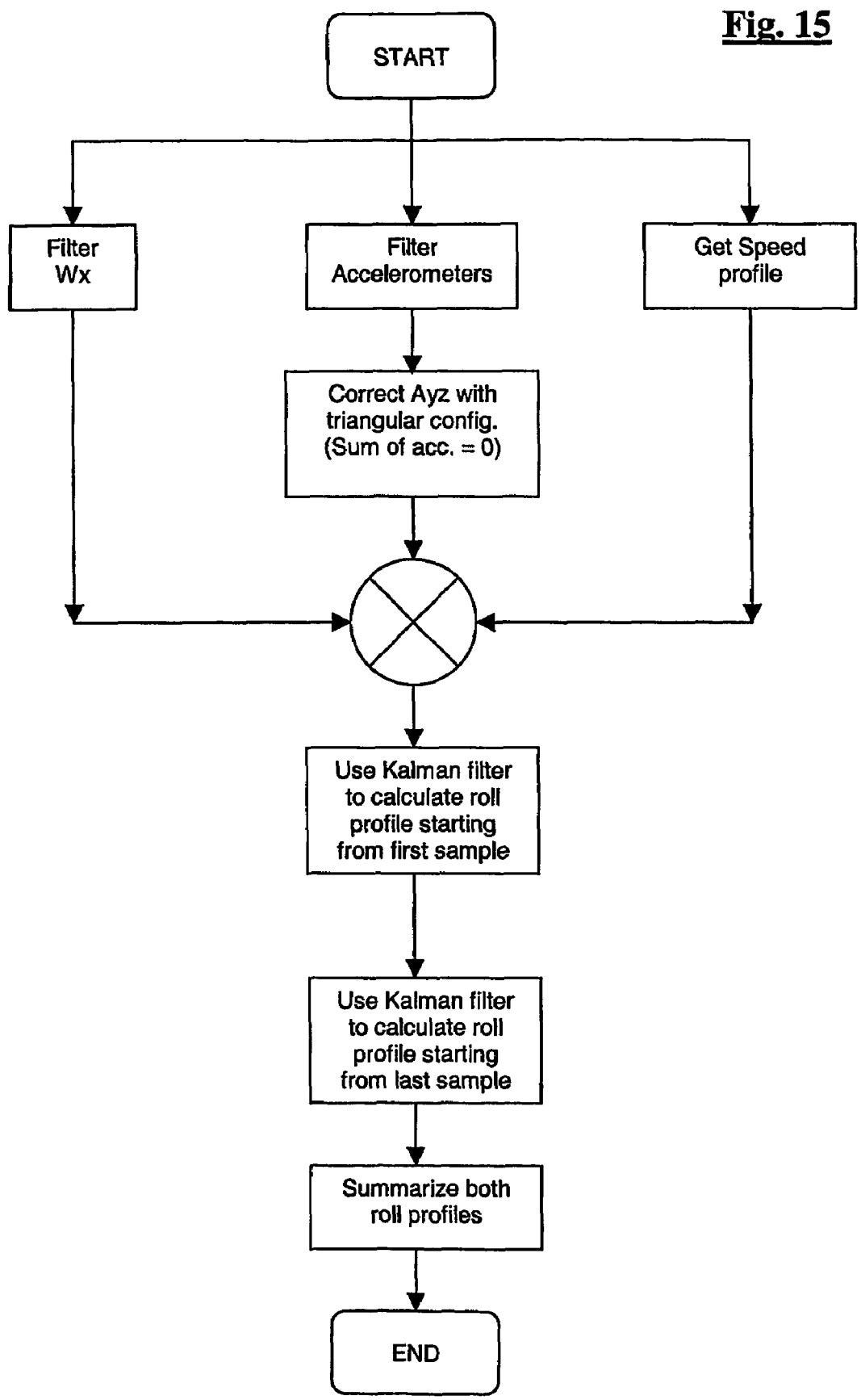
FIG. 15 shows a flow chart of a sub-algorithm of the algorithm of FIG. 13a and 13b for calculating a roll profile.

Subsequently in the algorithm of FIGS. 13a and 13b, first profiles for roll, pitch, heading and distance are calculated from the pre-processed measurement data and the virtual sensor data. The algorithm for calculating the roll profile is shown in FIG. 15, which is in fact an alternative for the algorithm of FIG. 7. In the algorithm of FIG. 7, the samples of the one or the other sensor group is chosen for obtaining a particular part of the roll profile. With the algorithm of FIG. 15, the samples of the different sensor groups are combined by intelligent averaging. An example of intelligent averaging is the use of a Kalman filter. In its simplest form, a Kalman filter assigns a weight to each sensor group and takes a weighed average. In more complex forms of Kalman filters, the weight can be varied for example according to what is actually measured (e.g. a straight, a bend, . . . ) or according to a comparison of a particular sample with past or future samples, or other. Kalman filtering is however known in the art, for example from Chatfield A. B., 1997, "Fundamentals of high accuracy inertial navigation", Progress in astronautics and aeronautics Vol 174 American institute of aeronautics and astronautics, Reston and from Titterton D H, Weston J L, 1997, "Strapdown Inertial Navigation Technology", Peter perigrinus Ltd, Stevenage, which are hereby incorporated by reference. Therefore, Kalman filtering will not be described in detail here. For further enhancing the accuracy of the roll profile obtainable by the algorithm of FIG. 15, it is calculated twice, namely from start to end and from end to start, and the two are summarized into a combined roll profile.

Figure 16:
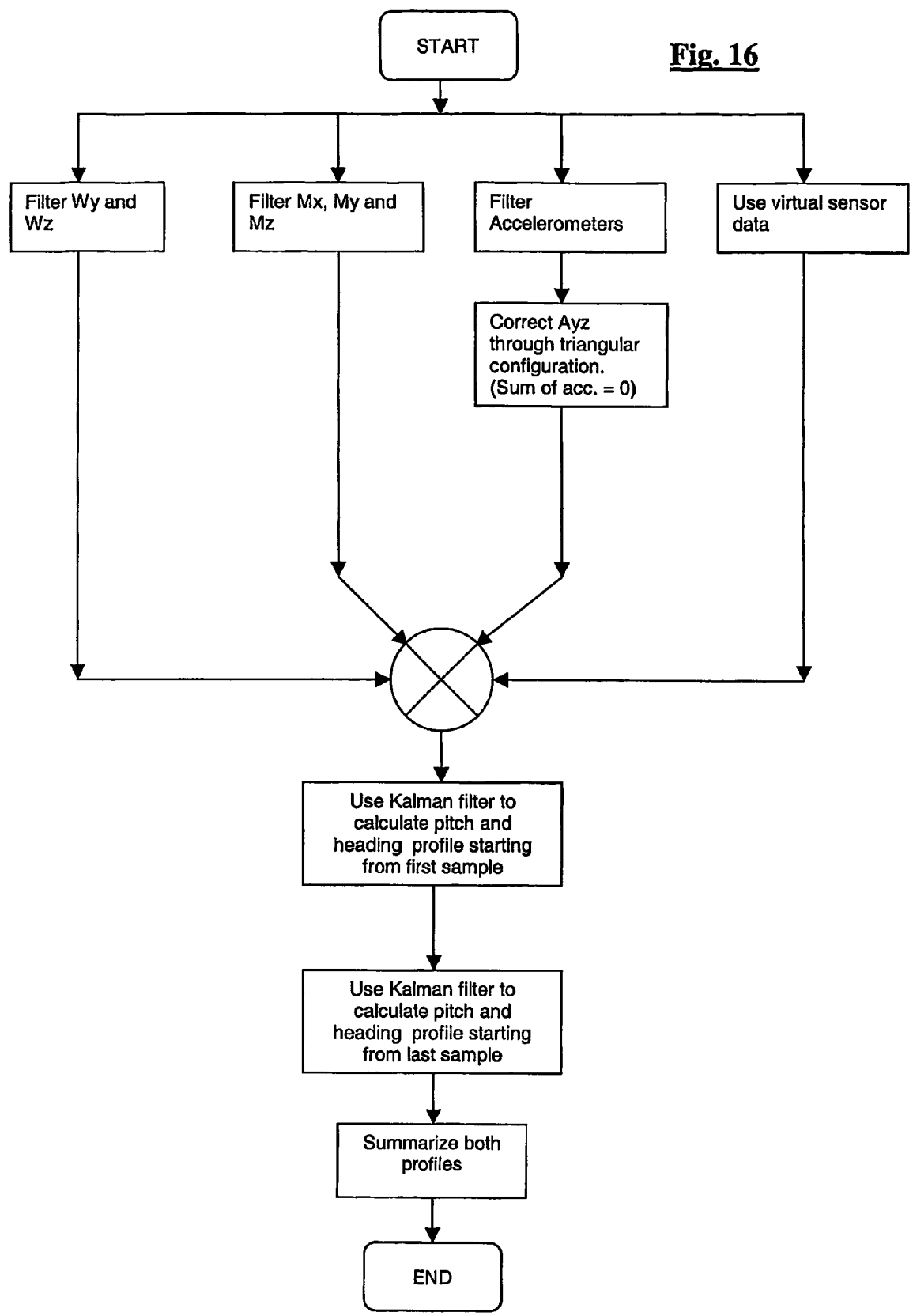
FIG. 16 shows a flow chart of a sub-algorithm of the algorithm of FIGS. 13a and 13b for calculating a heading profile and a pitch profile.

The algorithm for calculating the pitch and heading profiles is shown in FIG. 16. This algorithm is an alternative to that of FIG. 10. An important difference is that the algorithm of FIG. 16 incorporates the virtual sensor data as a sensor group. This shows that the geographical information which is known about the trajectory is introduced at an earlier stage, which can highly enhance the accuracy of the track. Furthermore, it is shown here that if the magnetometer (Mx, My, Mz) data is not fully trustable due to for example a metallic environment, the virtual sensor data is present as an alternative or for enhancement of the magnetometer data. Furthermore, in a similar way as in the algorithm of FIG. 15, the principle of Kalman filtering is used for calculating a forwards and a backwards profile for both heading and pitch, which are again summarised into combined profiles for heading and pitch.

Figure 17:
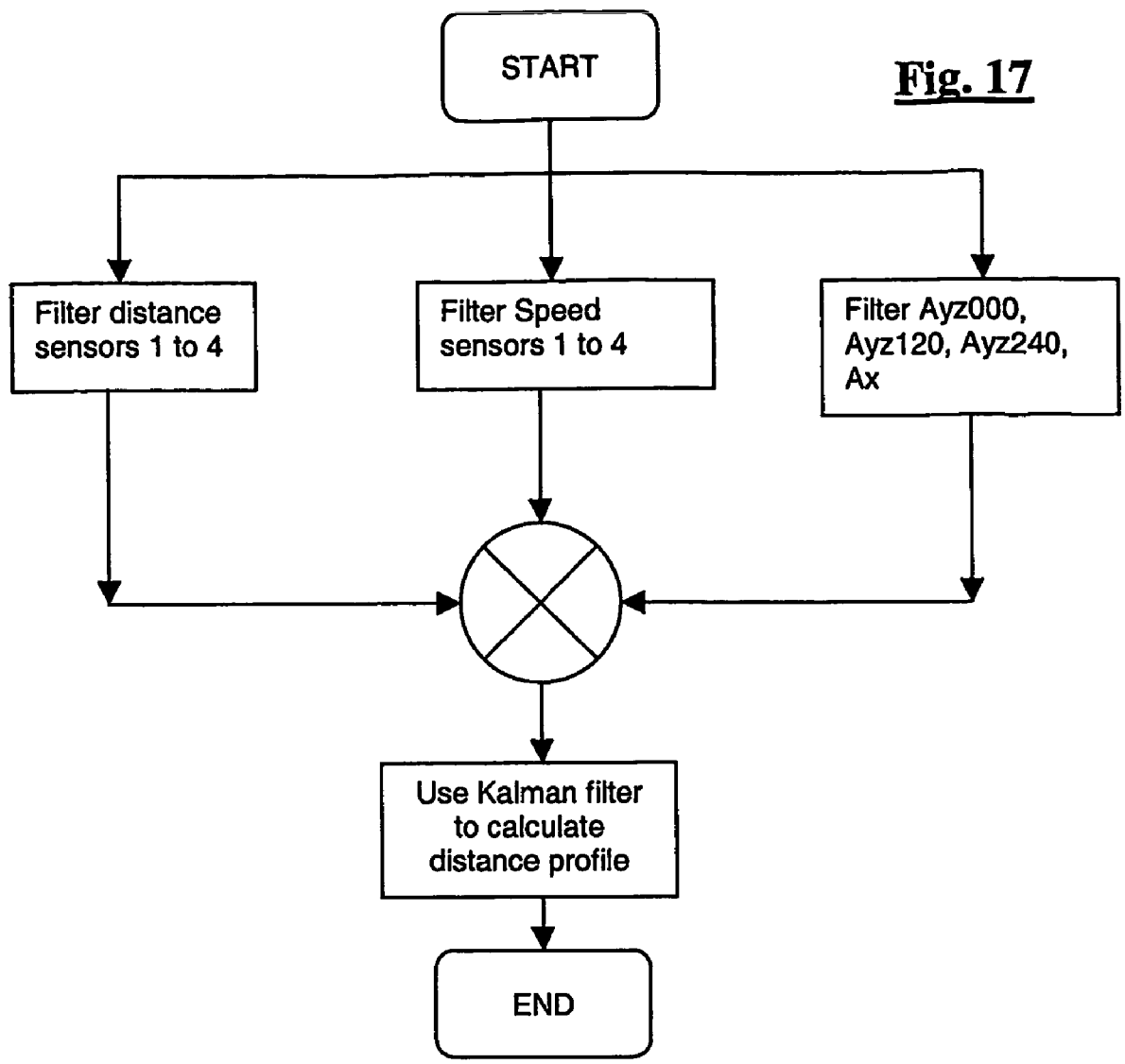
FIG. 17 shows a flow chart of a sub-algorithm of the algorithm of FIG. 13a and 13b for calculating a distance profile.

The algorithm for calculating the distance profile is shown in FIG. 17. Again, the measurement data of different sensor groups are combined by Kalman filtering into a distance profile.

In a next step of the data evaluation algorithm of FIGS. 13a and 13b, a first track is calculated from the first roll, distance, pitch and heading profiles. In the same way as in the algorithm of FIGS. 3a and 3b, this first track is tested for compliance with the desired accuracy by comparing the calculated coordinates of the end of the calculated track with the measured coordinates of the end location of the trajectory, which can be summarised in the condition:

Calculated XYZ–Measured XYZ<limit

A suitable limit is for example 10 cm on all axes, but this limit may also be chosen wider or narrower.

If this condition is fulfilled, the track is recalculated forwards and backwards, leading to a forwards and a backwards track. These two are combined to a single track, which is subjected to a final compensation step for averaging out noise on the track signals. This noise can for example frequency dependant measurement noise, jumps as a result of shocks experienced by the data collecting device, or other noise.

If this condition is not fulfilled, one or more of the algorithms for compensating the first roll, distance, pitch and heading profiles for trajectory constraints and/or geographical information, which have been discussed above with reference to FIGS. 3a and 3b and an example of which is given by the algorithm of FIG. 11, are applied and the iterative process is repeated. Since the compensation algorithms like the one of FIG. 11 refine the virtual sensor data, a larger weight is assigned to this data in the Kalman filters during the next run of the iterative process.

TABLE 1 sensor dependencies

| SENSOR | DEPENDENCY | ACTIVATOR |
|---|---|---|
| Wx | Temperature | Temperature. |
|  | Earth rotation | Earth rotation as a function of heading and pitch. |
|  | Direct acceleration | From acceleration of data collecting device in the x-axis and centrifugal force from Wy and Wz. |
|  | Cross acceleration in all yz directions | From centrifugal force on data collecting device in heading and pitch directions, and from acceleration of the Wy and Wz rate. |
|  | Misalignment with the x-axis of the data collecting device | Misalignment. |
| Wy | Temperature | Temperature. |
|  | Roll | From gravitation field. |
|  | Pitch | From gravitation field. |
|  | Earth rotation | Earth rotation as a function of heading an pitch. |
|  | Direct acceleration in the y axis | From centrifugal force on the data collecting device in heading and pitch directions, and from centrifugal force due to Wx |
|  | Cross acceleration in all zx directions | From centrifugal force on the data collecting device in heading and pitch directions, and from acceleration in the x-axis. |
|  | Misalignment with the Ayz000 direction | Misalignment. |
|  | Non-orthogonality with the x-axis | Misalignment. |
| Wz | Temperature | Temperature. |
|  | Roll | From gravitation field. |
|  | Pitch | From gravitation field. |
|  | Earth rotation | Earth rotation as a function of heading an pitch. |
|  | Direct acceleration in the z axis | From centrifugal force on the data collecting device in heading and pitch directions, and from centrifugal force due to Wx |
|  | Cross acceleration in all yx directions | From centrifugal force on the data collecting device in heading and pitch directions, and from acceleration in the x-axis. |
|  | Non-orthogonality with the y-axis | Misalignment. |
|  | Non-orthogonality with the x-axis | Misalignment. |
| Ax | Temperature | Temperature. |
|  | Roll | From gravitation field. |
|  | Pitch | From gravitation field. |
|  | Direct acceleration in the x-axis | From centrifugal force due to Wy and Wz. |
|  | Cross acceleration in all yz directions | From centrifugal force on data collecting device in heading and pitch directions, and from acceleration of the Wy and Wz rate. |
|  | Misalignment with with the x-axis | Misalignment |
| Ayz000 Ayz120 Ayz240 | Temperature | Temperature. |
|  | Direct acceleration in the 000, 120 or 240 axis | From Wx rotation, and from centrifugal force in heading- and pitch direction. |
|  | Cross acceleration in all directions: perpendicular to 000, 120 or 240 axis | From centrifugal force on the data collecting device in heading and pitch directions, and from acceleration in the x-axis. |
|  | Non-120°-between axes | Misalignment. |
|  | Non-orthogonality with the x-axis | Misalignment. |

The invention claimed is:

1. A method for determining a track of a geographical trajectory which has a predetermined start location and a predetermined end location, said method comprising the steps of:

a) moving a data collecting device from the start location to the end location, and while the device is being moved, sample wise collecting physical measurement data related to the movement of the device by a set of onboard sensors of the device, the sensors being synchronised to a common clock signal for said sample wise collection of physical measurement data, wherein the onboard sensors comprise a combination of sensors from whose measurement data a heading profile, a pitch profile and a roll profile are obtained and an odometer measuring a distance travelled with respect to the start location and from whose measurement data a distance profile is obtained, b) determining said heading profile, said pitch profile, said distance profile and said roll profile based on the collected measurement data, c) determining said track based on said heading profile, said pitch profile, said distance profile and said roll profile, characterised in that all said physical measurement data are stored during the movement of the device from the start location to the end location and that, after retrieval of the stored measurement data and before determining said profiles, the method further comprises the steps of:

d) determining at least first, respectively second trajectory parameters based on synchronously collected measurement data of a first, respectively second sensor of said set, said synchronously collected measurement data forming part of said stored measurement data, the first sensor measuring a different physical quantity from the second sensor and the first and second trajectory parameters being deduced to relate to a single physical quantity, and mapping said first trajectory parameters on said second trajectory parameters, e) determining an error compensation for said measurement data of said first and said second sensors based on said mapping, f) correcting said measurement data of said first and second sensors by means of said error compensation.

2. The method of claim 1, characterised in that the method further comprises the initial steps of pre-calibrating the data collecting device for determining an initial error compensation to be applied in step f), by moving the data collecting device along a predetermined trajectory in a controlled environment and mapping the measurement data collected during the movement along the predetermined trajectory on predetermined measurement data for the predetermined trajectory.

3. The method of claim 1, characterised in that at least one of said heading, pitch, roll and distance profiles is determined by fusing the measurement data collected by means of a group of sensors, said group being chosen in such a way among said set of sensors that a first portion of the measurement data of said group is complementary to a second portion of the measurement data of said group.

4. The method of claim 3, characterised in that said complementary first and second portions of the measurement data are fused by means of selection based on performance characteristics of the sensors included in said group and/or by means of combination.

5. The method of claim 1, characterised in that the method further comprises the step of resting the data collecting device on the start location, the end location and/or one or more predetermined intermediate locations of the trajectory for a predetermined amount of time.

6. The method of claim 5, characterised in that the method further comprises the step of compensating the measurement data of at least one sensor for systematic error build-up, based on a difference between the measurement data of said sensor collected during the resting period at the start location and the measurement data of said sensor collected during the resting period at the end location.

7. The method of claim 1, characterised in that the data collecting device comprises at least one temperature sensor and that the method further comprises the step of compensating the measurement data of at least one other sensor for temperature variations.

8. The method of claim 1, characterised in that the method further comprises the steps of determining coordinates on at least one location of the trajectory and compensating the heading profile and/or the pitch profile and/or the roll profile and/or the distance profile for the coordinates of the at least one location.

9. The method of claim 8, characterised in that coordinates are determined on the start location, the end location and/or one or more predetermined intermediate locations.

10. The method of claim 1, characterised in that the method further comprises the steps of measuring heading, pitch and/or roll of the data collecting device at the start location and/or the end location of the trajectory and compensating the heading profile and/or the pitch profile and/or the roll profile and/or the distance profile for deviations from the measured heading and/or pitch at the start and end locations.

11. The method of claim 1, characterised in that the method further comprises the step of compensating said track determined in step c) for trajectory constraints and/or geographical information.

12. The method of claim 11, characterised in that the trajectory constraints and/or geographical information comprise at least one of the following:

coordinates of the start location, the end location and/or one or more intermediate locations of the trajectory, coordinates of objects outside the trajectory, a maximum curvature of bent portions of the trajectory, a minimum length of straight portions of the trajectory.

13. The method of claim 1, characterised in that step c) comprises determining a forwards track based on said heading profile, said pitch profile, said distance profile and said roll profile from start to end, determining a backwards track based on said heading profile, said pitch profile, said distance profile and said roll profile from end to start, and combining the forwards and backwards tracks into an average track.

14. The method of claim 1, characterised in that steps a) to f) are repeated at least once, a track being determined from the measurement data collected during each move of the data collecting device, and that the method further comprises the step of combining said tracks into a final track.

15. A method for determining a track of a geographical trajectory which has a predetermined start location and a predetermined end location, said method comprising the steps of:

a) moving a data collecting device from the start location to the end location and while the device is being moved, sample wise collecting physical measurement data related to the movement of the device by a set of onboard sensors of the device, the sensors being synchronised to a common clock signal for said sample wise collection of physical measurement data, wherein the onboard sensors comprise a combination of sensors from whose measurement data a heading profile, a pitch profile and a roll profile are obtained and an odometer measuring a distance travelled with respect to the start location and from whose measurement data a distance profile is obtained, b) determining said heading profile, said pitch profile, said distance profile and said roll profile based on the collected measurement data, c) determining said track based on said heading profile, said pitch profile, said distance profile and said roll profile, characterised in that the method further comprises the step of:

d) collecting trajectory heading and/or pitch information from geographical information and/or trajectory constraints, e) organising the collected trajectory heading and/or pitch information as measurement data of a virtual sensor, which provides data as if it were incorporated in the data collecting device, with a sample rate synchronous to that of the common clock signal of the data collecting device, and that all said physical measurement data are stored during the movement of the device from the start location to the end location and that, after retrieval of the stored measurement data and before determining said profiles, the method further comprises the steps of:

f) determining another trajectory parameters based on synchronously collected measurement data of one or more onboard sensors of said set, said synchronously collected measurement data forming part of said stored measurement data, and further trajectory parameters based on the measurement data of the virtual sensor, and trajectory parameters being deduced to relate to a single physical quantity, and mapping said trajectory parameters, g) determining an error compensation for said measurement data of said one or more onboard sensors based on said mapping, h) correcting said measurement data of said one or more onboard sensors by means of said error compensation.

16. The method of claim 15, characterised in that a weight factor is assigned to each virtual trajectory parameter in step f), the weight factor being determined on the basis of the accuracy of the trajectory heading and/or pitch information and being taken into account for determining the error compensation in step g).

17. The method of claim 15, characterised in that the trajectory parameters are XYZ coordinates.

18. The method of claim 15, characterised in that the error compensation in step g) is determined by intelligent averaging.

19. The method of claim 15, characterised in that steps f) to h) are repeated at least once, each time using the corrected measurement data obtained in previous step h) as measurement data of onboard sensors in step f).

20. A method for determining a track of a geographical trajectory which has a predetermined start location and a predetermined end location, said method comprising the steps of:

a) moving a data collecting device from the start location to the end location and while the device is being moved, sample wise collecting physical measurement data related to the movement of the device by a set of onboard sensors of the device, the sensors being synchronised to a common clock signal for said sample wise collection of physical measurement data, wherein the onboard sensors comprise a combination of sensors from whose measurement data a heading profile, a pitch profile and a roll profile are obtained and an odometer measuring a distance travelled with respect to the start location and from whose measurement data a distance profile is obtained, storing all said collected physical measurement data during the movement of the device from the start location to the end location, c) retrieving, from said stored measurement data, synchronously collected measurement data of a first, respectively second sensor of said set, wherein the first sensor measures a different physical quantity from the second sensor, d) determining at least first, respectively second trajectory parameters based on said Synchronously collected measurement data, the first and second trajectory parameters being deduced to relate to a single physical quantity, and mapping said first trajectory parameters on said second trajectory parameters, e) determining an error compensation for said measurement data of said first and said second sensors based on said mapping, f) correcting said measurement data of said first and second sensors by means of said error compensation, g) determining said heading profile, said pitch profile, said distance profile and said roll profile based on the corrected measurement data and other collected measurement data among said stored measurement data, h) determining said track based on said heading profile, said pitch profile, said distance profile and said roll profile.

21. A method for determining a track of a geographical trajectory which has a predetermined start location and a predetermined end location, said method comprising the steps of:

a) moving a data collecting device from the start location to the end location and while the device is being moved, sample wise collecting physical measurement data related to the movement of the device by a set of onboard sensors of the device, the sensors being synchronised to a common clock signal for said sample wise collection of physical measurement data, wherein the onboard sensors comprise a combination of sensors from whose measurement data a heading profile, a pitch profile and a roll profile are obtained and an odometer measuring a distance travelled with respect to the start location and from whose measurement data a distance profile is obtained, b) storing all said collected physical measurement data during the movement of the device from the start location to the end location, c) collecting trajectory heading and/or pitch information from geographical information and/or trajectory constraints, d) organising the collected trajectory heading and/or pitch information as virtual measurement data of a virtual sensor, which provides data as if it were incorporated in the data collecting device, with a sample rate synchronous to that of the common clock signal of the data collecting device, e) retrieving, from said stored measurement data, synchronously collected measurement data of one or more onboard sensors of said set, f) determining another trajectory parameters based on said synchronously collected measurement data and further trajectory parameters based on said virtual measurement data, and trajectory parameters being deduced to relate to a single physical quantity, and mapping said trajectory parameters, g) determining an error compensation for said measurement data of said one or more onboard sensors based on said mapping, h) correcting said measurement data of said one or more onboard sensors by means of said error compensation, i) determining said heading profile, said pitch profile, said distance profile and said roll profile based on the corrected measurement data and other collected measurement data among said stored measurement data, j) determining said track based on said heading profile, said pitch profile, said distance profile and said roll profile.

* * * * *